United States Patent
Nagasawa et al.

(10) Patent No.: US 10,081,323 B2
(45) Date of Patent: Sep. 25, 2018

(54) VEHICLE OCCUPANT PROTECTION DEVICE

(71) Applicant: Fuji Jukogyo Kabushiki Kaisha, Tokyo (JP)

(72) Inventors: Isamu Nagasawa, Tokyo (JP); Masaaki Kobayashi, Tokyo (JP); Takeru Shoji, Tokyo (JP); Yoshihiro Kamata, Tokyo (JP); Masaya Watanabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 73 days.

(21) Appl. No.: 15/268,735

(22) Filed: Sep. 19, 2016

(65) Prior Publication Data

US 2017/0088078 A1    Mar. 30, 2017

(30) Foreign Application Priority Data

Sep. 30, 2015   (JP) .................. 2015-194728
Sep. 30, 2015   (JP) .................. 2015-194729
Sep. 30, 2015   (JP) .................. 2015-194730

(51) Int. Cl.
*B60R 21/203*     (2006.01)
*B60R 21/013*     (2006.01)
(Continued)

(52) U.S. Cl.
CPC ............ *B60R 21/013* (2013.01); *B60R 21/20* (2013.01); *B60R 21/231* (2013.01); *B60R 2021/161* (2013.01); *B60R 2021/23161* (2013.01)

(58) Field of Classification Search
CPC ..... B60R 21/013; B60R 21/20; B60R 21/231; B60R 2021/01013; B60R 2021/161; B60R 2021/23161; B60R 21/203

USPC .......................................................... 701/45
See application file for complete search history.

(56) References Cited

U.S. PATENT DOCUMENTS 6,527,295 B2    3/2003  Müller
6,816,766 B2 *  11/2004 Sala .................... B60R 21/0132
                                                                 280/735
(Continued)

FOREIGN PATENT DOCUMENTS

DE    198 53 322 A1    5/2000
DE    198 53 322 B4    3/2006
(Continued)

OTHER PUBLICATIONS

Chan, Trends in Crash Detection and Occupant Restraint Technology, 2007, IEEE, p. 388-396 (Year: 2007).*

(Continued)

*Primary Examiner* — McDieunel Marc
(74) *Attorney, Agent, or Firm* — McGinn I.P. Law Group, PLLC

(57) ABSTRACT

A vehicle occupant protection device includes an airbag module, an actuator, and a controller. The airbag module includes an airbag and an inflator that allows the airbag to develop. The actuator attaches the airbag module to a vehicle, to cause a change in relative positional relation between the vehicle and the airbag module. The controller determines a collision mode of the vehicle, on a basis of one or more of input information used in prediction of the collision mode, input information upon a collision of the vehicle, and input information on an internal situation of the vehicle, and controls the relative positional relation between the vehicle and the airbag module. The airbag module allows the airbag to be developed in a state in which the change in the relative positional relation between the vehicle and the airbag module is caused by the actuator.

38 Claims, 22 Drawing Sheets

(51) Int. Cl.
- *B60R 21/231* (2011.01)
- *B60R 21/20* (2011.01)
- *B60R 21/16* (2006.01)

(56) References Cited

U.S. PATENT DOCUMENTS

| | | | |
|---|---|---|---|
| 7,201,394 B2* | 4/2007 | Mori | B60R 21/2155 280/728.3 |
| 7,204,511 B2* | 4/2007 | Mori | B60R 21/203 280/731 |
| 8,678,429 B2* | 3/2014 | Nagasawa | B60R 21/233 280/729 |
| 8,910,971 B1 | 12/2014 | Faruque et al. | |
| 8,910,974 B2* | 12/2014 | Nagasawa | B60R 21/203 280/729 |
| 9,283,911 B2* | 3/2016 | Nagasawa | B60R 21/015 |
| 2003/0195685 A1 | 10/2003 | Mori et al. | |
| 2007/0228705 A1* | 10/2007 | Rao | B60R 21/0134 280/735 |
| 2016/0009242 A1* | 1/2016 | Fukawatase | B60R 21/2338 280/730.1 |

FOREIGN PATENT DOCUMENTS

| | | |
|---|---|---|
| JP | H06-024286 A | 2/1994 |
| JP | 2003-306121 A | 10/2003 |
| JP | 2014-151676 A | 8/2014 |

OTHER PUBLICATIONS

Murad et al., Modeling and Simulation of an Advanced Intelligent Restraint System, 2009, IEEE, p. 1-5 (Year: 2009).*

Chang, Sensing Problems in Automotive Occupant Restraint System, 1995, IEEE, p. 60-65 (Year: 1995).*

Mon et al., Intelligent Vehicle Airbag Controller Design, 2004, IEEE, p. 908-913 (Year: 2004).*

Huang et al., A Comparative Study on Airbag Inflation Properties Unis CV and ALE-Based Approaches, 2012, IEEE, p. 17-20 Year: 2012).*

Murad et al., Intelligent Adaptive Occupant Restraint System, 2009, IEEE, p. 1-6 (Year: 2009).*

Moon, Intelligetn airbag deployment algorithm design and implemented by DSP chip, 2005, IEEE, p. 1-6 (Year: 2005).*

Watanabe et al., Optimal Triggering of an Airbag, 1993, IEEE, p. 78-83 (Year: 1993).*

Cho et al., Design of an Airbag Deployment Algorithm Based on Precrash Information, 2011, IEEE, p. 1438-1452 (Year: 2011).*

Hu Lin et al., Investigation on the Behaviour of New Type Airbag, 2009, IEEE, p. 103-107 (Year: 2009).*

Chan et al., Feasibility Analysis of Steering Control as a Driver-Assistance Function in Collision Situations, 2001, IEEE, p. 1-9 (Year: 2001).*

Ertlmeier et al., Expanding design process of the Airbag Control Unit ACU Connection of active and passive safety by using vehicles dynamics for rollover and side crash detection, 2008, IEEE, p. 1-9 (Year: 2008).*

Japanese Office Action (JP 2015-194730) dated Sep. 6, 2016 with English machine translation thereof.

Japanese Office Action (JP 2015-194728) dated Sep. 13, 2016 with English machine translation thereof.

Japanese Office Action (JP 2015-194729) dated Sep. 13, 2016 with English machine translation thereof.

Chinese Office Action, dated Jun. 4, 2018, in Chinese Application No. 201610857246.

* cited by examiner

VEHICLE OCCUPANT PROTECTION DEVICE

CROSS-REFERENCE TO RELATED APPLICATIONS

The present application claims priority from Japanese Patent Application Nos. 2015-194728, 2015-194729, and 2015-194730 which are filed on Sep. 30, 2015, the entire contents of each of which are hereby incorporated by reference.

BACKGROUND

The technology relates to a vehicle occupant protection device that may be applicable to vehicles such as automobiles.

Vehicles such as automobiles are provided with various kinds of occupant protection devices.

For example, Japanese Unexamined Patent Application Publication (JP-A) No. 2014-151676 discloses a technique that utilizes a front airbag and a curtain airbag. The front airbag may be developed on front side of an occupant who is seated on a seat. The curtain airbag may be developed on outer side of the occupant.

In this technique, when an automobile collides with another automobile, the front airbag may be developed on the front side of the occupant who is seated on the seat. The front airbag thus developed may support the occupant who falls frontward, and protect the occupant.

SUMMARY

Even when a plurality of airbags are developed in a vehicle, however, there may be possibility that the airbags fail in coming into contact with an occupant who falls frontward in case an unexpected collision should occur. There may be also possibility that the airbags fail in sufficiently receiving a load of the occupant.

To cope with such an unexpected collision mode, one method may be to provide the vehicle with additional airbags. This method, however, may possibly face another challenge in making sufficient space for development of the additional airbags, with the front airbag and the curtain airbag already installed in the vehicle.

It is desirable to provide a vehicle occupant protection device that makes it possible to protect an occupant in an increased variety of collision modes, without installing additional airbags.

An aspect of the technology provides a vehicle occupant protection device that includes an airbag module, an actuator, and a controller. The airbag module includes an airbag and an inflator that allows the airbag to develop. The actuator attaches the airbag module to a vehicle, to cause a change in relative positional relation between the vehicle and the airbag module. The controller determines a collision mode of the vehicle, on a basis of on one or more of input information used in prediction of the collision mode, input information upon a collision of the vehicle, and input information on an internal situation of the vehicle, and controls the relative positional relation between the vehicle and the airbag module. The airbag module allows the airbag to be developed, in a state in which the change in the relative positional relation between the vehicle and the airbag module is caused by the actuator.

DETAILED DESCRIPTION

In the following, some implementations of the technology are described with reference to the accompanied drawings. Note that the description is given in the following order.

1. Vehicle Occupant Protection Device according to First Implementation
   1-1. Configuration Example 1
   1-2. Configuration Example 2
   1-3. Configuration Example 3
   1-4. Configuration Example 4
   1-5. Configuration Example 5
2. Vehicle Occupant Protection Device according to Second Implementation
   2-1. Configuration Example 1
   2-2. Configuration Example 2
   2-3. Configuration Example 3
3. Vehicle Occupant Protection Device according to Third Implementation
   3-1. Configuration Example 1
   3-2. Configuration Example 2
   3-3. Configuration Example 3

[1. Vehicle Occupant Protection Device according to First Implementation]

The following is a description of a vehicle occupant protection device (hereinafter simply referred to as a "protection device") according to a first implementation of the technology. The protection device may have any one of configurations as described in the following configuration examples 1 to 5.

1-1. Configuration Example 1

First, a description is given of a protection device 2 according to a configuration example 1.

[Configuration of Vehicle to which Protection Device is Applied]

The protection device 2 according to the configuration example 1 may be applied to a vehicle 1. The vehicle 1 may have a configuration, for example, as described below.

Figure 1A:
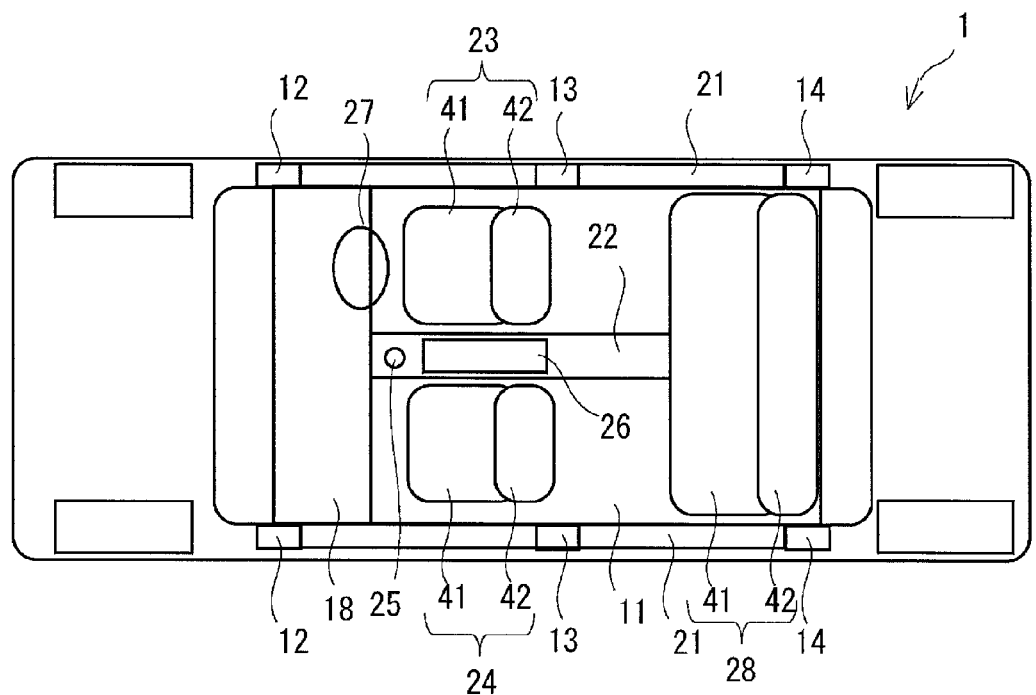
FIG. 1A is a schematic top view of a configuration of a vehicle to which a vehicle occupant protection device according to a configuration example 1 of a first implementation of the technology is applied.
Figure 1B:
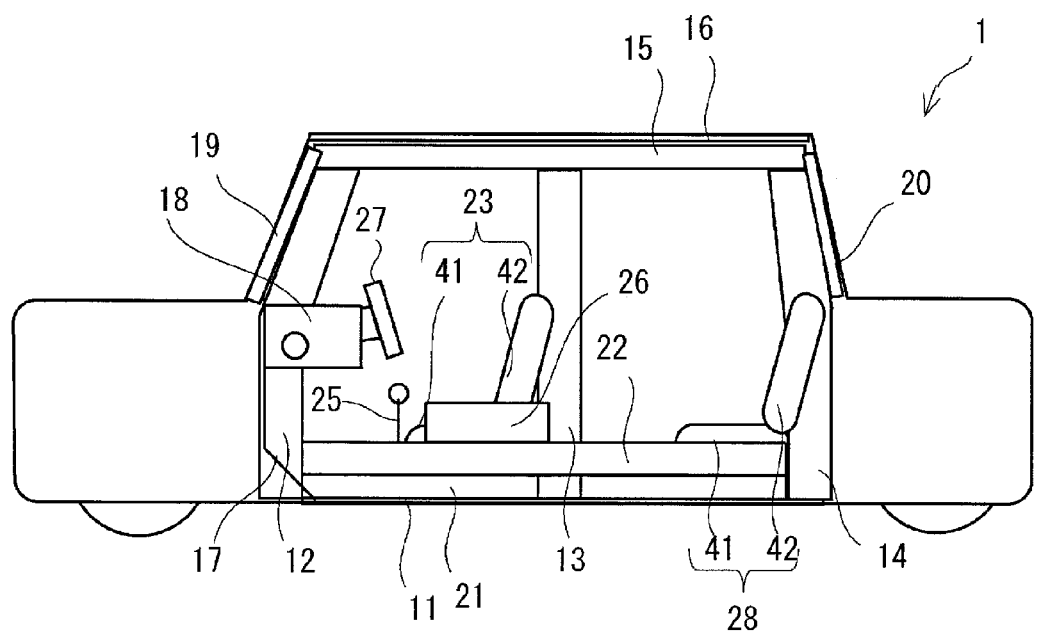
FIG. 1B is a schematic side view of the configuration of the vehicle to which the vehicle occupant protection device according to the configuration example 1 of the first implementation of the technology is applied.

FIGS. 1A and 1B schematically illustrate the configuration of the vehicle 1 to which the protection device 2 according to the configuration example 1 is applied. FIG. 1A is a top view of the vehicle 1, and FIG. 1B is a side view of the vehicle 1.

Note that directions and dimensions in FIGS. 1A and 1B are defined as follows. The left side and the right side of FIGS. 1A and 1B are respectively defined as "front" and "rear" including their variants. The upper side and the lower side of FIG. 1B are respectively defined as "up" and "down" including their variants. Further, a dimension in the up-down direction in FIG. 1A is defined as a "width", whereas a dimension in the up-down direction in FIG. 1B is defined as a "height". These definitions apply to FIG. 2 and any subsequent drawing as well.

There is no limitation on kinds or categories of the vehicle 1. The vehicle 1 as described here may be, for example, an automobile. The vehicle 1 may be provided with an occupant compartment, a front chamber, and a rear chamber. The occupant compartment may be disposed in a substantially middle part of the vehicle 1 in a front-rear direction, and designed to allow for boarding and conveyance of occupants. The front chamber may be disposed in a front part of the vehicle 1. Components such as a fuel engine may be installed in the front chamber. The rear chamber may be disposed in a rear part of the vehicle 1, and utilized as, for example, a baggage room.

The occupant compartment may include a floor panel 11, a pair of A pillars 12, a pair of B pillars 13, and a pair of C pillars 14. The floor panel 11 may have, for example, a substantially rectangular shape. The pair of A pillars 12 may be installed in a standing manner at front corners of the floor panel 11. The pair of B pillars 13 may be installed in the standing manner at substantially midpoints of two sides of the floor panel 11 in the front-rear direction. The pair of C pillars 14 may be installed in the standing manner at rear corners of the floor panel 11. The pair of A pillars 12 and the pair of C pillars 14 may be coupled together by a pair of roof rails 15. Each of the pair of B pillars 13 may be joined to a substantially midpoint of each of the pair of roof rails 15 in the front-rear direction. Between the pair of roof rails 15, a roof panel 16 may be disposed. The roof panel 16 may have, for example, a substantially rectangular shape. Two sides of the roof panel 16 may be joined to the pair of roof rails 15.

A toe board 17, for example, may be disposed between the floor panel 11 and the pair of A pillars 12. A dashboard 18, for example, may be disposed above the toe board 17. A windshield 19 may be fitted in space surrounded by the dashboard 18, the pair of A pillars 12, and the roof panel 16. A rear window 20 may be fitted in space between the pair of C pillars 14.

A pair of front doors may be disposed between the pair of A pillars 12 and the pair of B pillars 13. The pair of front doors may be pivotably supported by respective ones of the pair of A pillars 12. A pair of rear doors may be disposed between the pair of B pillars 13 and the pair of C pillars 14. The pair of rear doors may be pivotably supported by respective ones of the pair of B pillars 13. Note that the pair of front doors and the pair of rear doors are undepicted in FIGS. 1A and 1B. A pair of side sills 21 may be joined to two sides of the floor panel 11 in a widthwise direction.

As described, the vehicle 1 may be provided with the occupant compartment that may be box-shaped space having a three-dimensional shape such as a substantially rectangular parallelepiped.

A center tunnel 22, for example, may be disposed in a substantially middle part of the floor panel 11 in the widthwise direction. The center tunnel 22 may be projected toward an inside of the occupant compartment, and extend in the front-rear direction. Components such as a drive shaft may be disposed below the center tunnel 22. The drive shaft may transmit driving force from the fuel engine to rear wheels.

A front part of the floor panel 11 may be furnished with front seats. The front seats may include, for example, two seats disposed side by side in the widthwise direction, e.g., a driver's seat 23 and a navigator's seat 24. The driver's seat 23 may be a seat that may be used by a driver. The navigator's seat 24 may be a seat that may be used by an occupant who travels with the driver. The driver's seat 23 may include, for example, a seating section 41, and a backrest section 42 attached to the seating section 41. The navigator's seat 24 may include, for example, the seating section 41 and the backrest section 42, similarly to the driver's seat 23 as mentioned above. The center tunnel 22 as mentioned above may be disposed between the seating section 41 of the driver's seat 23 and the seating section 41 of the navigator's seat 24. Components such as a shift lever 25, a parking brake lever, and a console box 26 may be disposed above the center tunnel 22. In one implementation, the console box 26 may serve as an "interior member". Note that the parking brake lever is undepicted in FIGS. 1A and 1B.

The dashboard 18 may be disposed in front of the driver's seat 23 and the navigator's seat 24, and extended in the widthwise direction. A steering wheel 27 may be disposed in front of the driver's seat 23, and projected rearward from the dashboard 18.

A rear part of the floor panel 11 may be furnished with a rear seat. The rear seat may include, for example, one seat that may be used by a plurality of occupants, e.g., a bench seat 28. The bench seat 28 may include, for example, the seating section 41 and the backrest section 42, similarly to the driver's seat 23 as mentioned above. The bench seat 28 may have a width equivalent to, for example, a width of the floor panel 11. The bench seat 28 may be a seat that may be used by the plurality of occupants, as mentioned above. In one specific but non-limiting implementation, the bench seat 28 may allow for seating of, for example, three occupants at maximum.

[Configuration of Protection Device]

The protection device 2 may be mounted on the vehicle 1, and designed to protect the occupants or other conveyance objects if a collision should occur. The protection device 2 according to the configuration example 1 may have a configuration as described below.

Figure 2:
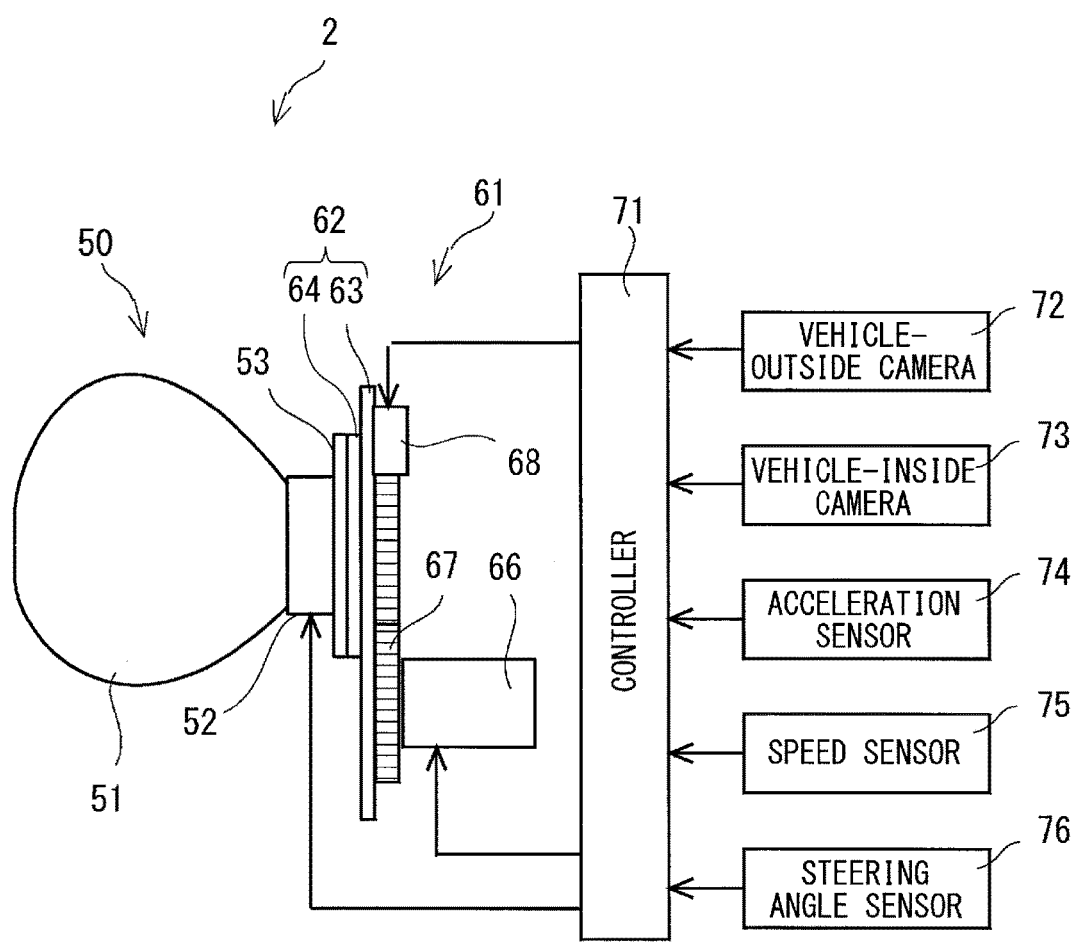
FIG. 2 illustrates a configuration of the vehicle occupant protection device according to the configuration example 1 of the first implementation of the technology.

FIG. 2 illustrates the configuration of the protection device 2 according to the configuration example 1.

The protection device 2 includes an airbag module 50, an actuator 61, and a controller 71.

The airbag module 50 may include an airbag 51, an inflator 52, and a module base 53.

The airbag 51 may be made of, for example, cloth that is sewn in a bag shape.

The inflator 52 may include, for example, a small-sized tank that may store substances such as an explosive and high-pressure gas. The inflator 52 allows the airbag 51 to develop. The inflator 52 may be coupled to the airbag 51.

The module base 53 may include, for example, a metal plate. The airbag 51 and the inflator 52 may be fixed to the module base 53.

The airbag 51 may be developed from the module base 53 toward a predetermined direction, i.e., a direction of the development. The direction of the development of the airbag 51 may be changed, in accordance with rotation of the airbag module 50 as described later, around a rotation axis of the airbag module 50.

The actuator 61 attaches the airbag module 50 to the vehicle 1, to cause a change in relative positional relation between the vehicle 1 and the airbag module 50. In one specific but non-limiting implementation, the actuator 61 may cause the rotation of the airbag module 50 around the predetermined rotation axis. The actuator 61 may include a rotation mechanism 62, a driving motor 66, a link mechanism 67, and a lock mechanism 68.

The rotation mechanism 62 may attach the airbag module 50 to the vehicle 1, to cause the rotation of the airbag module 50. The rotation mechanism 62 may include a fixed plate 63 and a movable plate 64. The fixed plate 63 and the movable plate 64 may be stacked on each other with a ball bearing in between, and rotated relatively to each other. The fixed plate 63 may be fixed to the vehicle 1. The module base 53 of the airbag module 50 may be fixed to the movable plate 64. Thus, the rotation mechanism 62 may attach the airbag module 50 to the vehicle 1, to cause the rotation of the airbag module 50 around the rotation axis of the rotation mechanism 62.

The driving motor 66 may include, for example, a direct-current motor. The driving motor 66 may be attached to the fixed plate 63 of the rotation mechanism 62.

The link mechanism 67 may include, for example, a plurality of gears. The link mechanism 67 may be driven by the controller 71. The link mechanism 67 may be disposed between the driving motor 66 and the movable plate 64. This allows the movable plate 64 to rotate with utilization of driving force of the driving motor 66, causing the airbag module 50 to be rotated relatively to the vehicle 1. In this way, the link mechanism 67 may cause the rotation of the airbag module 50. In one alternative, the link mechanism 67 may couple the driving motor 66 and the movable plate 64 through a wire. In this alternative, the wire may be driven by controller 71, and the link mechanism 67 may cause the rotation of the airbag module 50 with utilization of the wire.

The lock mechanism 68 may lock the rotation of the airbag module 50 when the airbag 51 is developed. The lock mechanism 68 may include, for example, a hook that is provided on the fixed plate 63 of the rotation mechanism 62.

The lock mechanism 68 may allow the hook to be hooked on the movable plate 64 before the airbag 51 is developed, to inhibit the rotation of the airbag module 50. Thus, the airbag module 50 allows the airbag 51 to be developed in a state in which the change in the relative positional relation between the vehicle 1 and the airbag module 50 is caused by the actuator 61. In one specific but non-limiting implementation, the airbag module 50 may allow the airbag 51 to be developed, in a state in which the airbag module 50 is rotated a predetermined rotation angle with utilization of the driving motor 66.

Figure 3A:
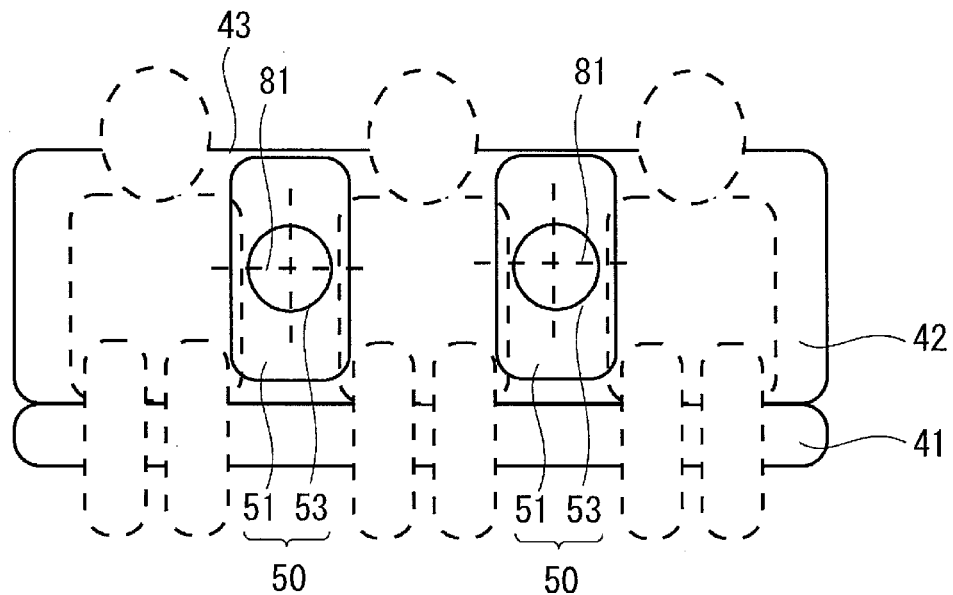
FIG. 3A is a front view of arrangement of components of the vehicle occupant protection device illustrated in FIG. 2.
Figure 3B:
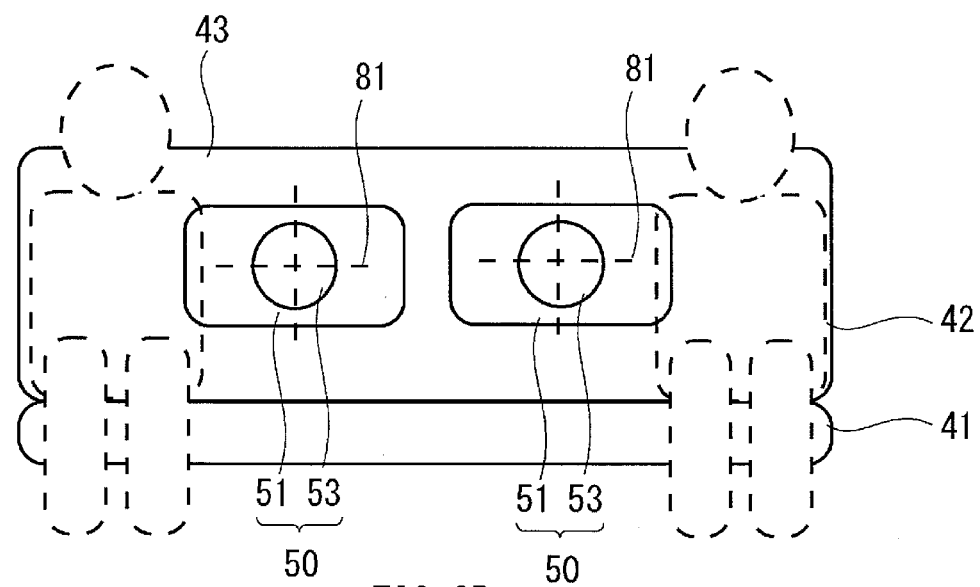
FIG. 3B is another front view of the arrangement of the components of the vehicle occupant protection device illustrated in FIG. 2.

FIGS. 3A and 3B are front views of arrangement of components of the protection device 2 illustrated in FIG. 2.

The airbag module 50 may be installed in, for example, an inside of the bench seat 28. In one specific but non-limiting implementation, when the bench seat 28 may be a seat that allows for seating of three persons, two airbag modules 50 may be disposed. A first one of the two airbag modules 50 may be disposed at a distance equivalent to one third of the width of the bench seat 28 from one of opposite ends of the bench seat 28 in the widthwise direction. A second one of the two airbag modules 50 may be disposed at a distance equivalent to one third of the width of the bench seat 28 from another of the opposite ends of the bench seat 28 in the widthwise direction. The rotation mechanism 62 may be attached to a substantially middle part of the backrest section 42, or a seat frame, in a heightwise direction.

A three-dimensional shape of the airbag 51 may be, for example, a shape elongated in one direction, or a so-called anisotropic shape. The module base 53 may be attached to the rotation mechanism 62, to allow the airbag 51 to be developed frontward in the direction of the development that coincides with the rotation axis. The airbag 51 may be developed vertically and horizontally with the module base 53 serving as a center. In an initial state, the airbag 51 may be developed in a vertically-elongated three-dimensional shape, in a region between a plurality of seating positions provided on the bench seat 28. The plurality of seating positions refers to positions at which a plurality of occupants are seated. The plurality of seating positions may be arranged in the widthwise direction. In a state in which the airbag module 50 is rotated 90 degrees of the rotation angle, the airbag 51 may be developed in a horizontally-elongated three-dimensional shape, in the region between the plurality of seating positions provided on the bench seat 28.

The backrest section 42 of the bench seat 28 may include a seat cover 43. The seat cover 43 may have, for example, a plurality of breakers 81 that may selectively break in accordance with the rotation angle of the airbag module 50. The plurality of breakers 81 may be extended radially from the predetermined rotation axis as a center. The plurality of breakers 81 may be disposed at intervals of a predetermined rotation angle. Thus, the airbag 51 that has been developed inside the seat cover 43 may break through the seat cover 43 with utilization of the plurality of breakers 81, and be developed frontward of the seat cover 43.

In the following, the airbag 51 as described above is also referred to as an inter-occupant airbag 51.

The controller 71 determines a collision mode of the vehicle 1 as described later. The controller 71 also controls the relative positional relation between the vehicle 1 and the airbag module 50. The relative positional relation between the vehicle 1 and the airbag module 50 is changed by the actuator 61. The controller 71 may include, for example, a microcomputer. The microcomputer may include components such as CPU, ROM, RAM, an input output port, and a system bus that couples the forgoing components. The ROM may store, for example, a program that may control operation of the protection device 2. The CPU may perform, as its main operation, loading of the program stored in the ROM into the RAM, and execution of the program. Thus, the microcomputer may serve as the controller 71 of the protection device 2.

The inflator 52, the driving motor 66, the lock mechanism 68, various detectors, and other components may be coupled to the input output port. The various detectors may include, for example, a vehicle-outside camera 72, a vehicle-inside camera 73, an acceleration sensor 74, a speed sensor 75, and a steering angle sensor 76. The vehicle-outside camera 72 may capture, from inside the occupant compartment, an image of an outside of the vehicle 1, e.g., an image ahead of the vehicle 1. The vehicle-inside camera 73 may capture an image of an inside of the vehicle 1. The controller 71 may control operation of the protection device 2, on the basis of information inputted from the various detectors as exemplified above. The controller 71 may control the rotation of the airbag module 50 caused by the actuator 61.

[Operation of Protection Device]

The protection device 2 according to the configuration example 1 may operate, for example, as follows.

Figure 4:
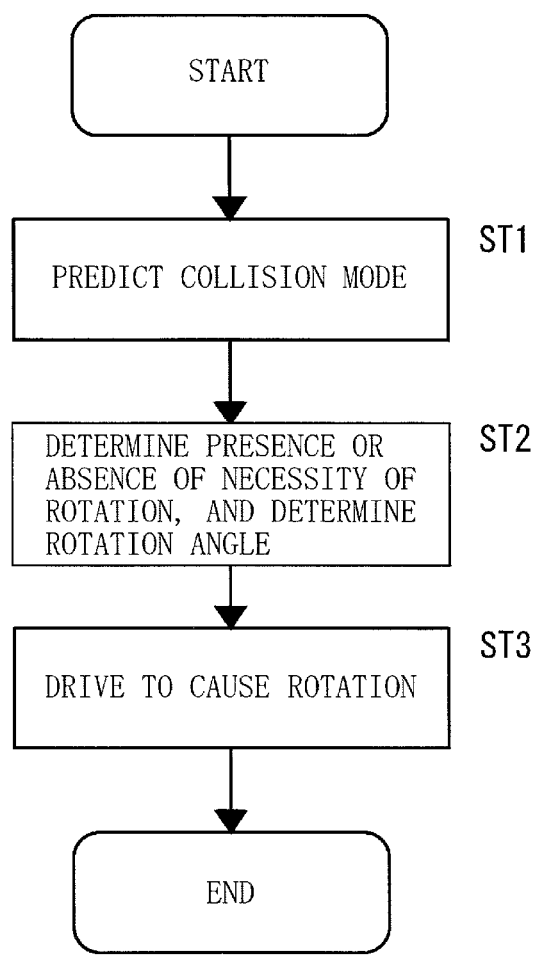
FIG. 4 is a flowchart that illustrates operation of a controller illustrated in FIG. 2, that is, a procedure of rotating operation of an airbag module.

FIG. 4 is a flowchart that illustrates operation of the controller 71 illustrated in FIG. 2, i.e., a procedure of rotating operation of the airbag module 50. The controller 71 may periodically execute the operation illustrated in FIG. 4.

Before a collision of the vehicle 1, the controller 71 may predict or determine the collision mode, on the basis of input information that is supplied to the input output port (step ST1). The input information may indicate internal and external situations of the vehicle 1.

Here, the input information that may indicate the internal and external situations of the vehicle 1 may include, for example, one kind, or two or more kinds of the following: input information used in prediction of the collision mode of the vehicle 1; input information upon the collision of the vehicle 1; and input information that indicates the internal situation and the external situation of the vehicle 1. Non-limiting examples of the input information used in the prediction of the collision mode of the vehicle 1 may include the captured image of the outside of the vehicle 1. Non-limiting examples of the input information that indicates the internal situation and the external situation of the vehicle 1 may include the captured image of the inside of the vehicle 1.

Non-limiting examples of the collision mode may include a full-lap collision, an offset collision, an oblique collision, and a side collision. The full-lap collision refers to, for example, a collision in which the vehicle 1 collides head-on with an opposite vehicle over an entire width of the vehicle 1, i.e., a collision in which the vehicle 1 and the opposite vehicle collide with each other in a directly confronted state. The offset collision refers to, for example, a collision in which the vehicle 1 collides head-on with the opposite vehicle over a part of the width of the vehicle 1, i.e., a collision in which the vehicle 1 and the opposite vehicle collide with each other in a non-directly confronted state, or a deviated state. The oblique collision refers to, for example, a collision in which the vehicle 1 collides head-on with the opposite vehicle in a more deviated state than that of the offset collision as mentioned above. The side collision refers to, for example, a collision in which another vehicle collides with a side surface of the vehicle 1. Such differences among these collision modes may cause a change in behavior of the vehicle 1 and behavior of the occupants upon the collision.

The controller 71 may, therefore, firstly, predict or determine the collision mode, on the basis of the input information on the internal and external situations of the vehicle 1, in predicting or determining the collision mode before the collision of the vehicle 1.

In one specific but non-limiting implementation, the controller 71 may predict, on the basis of information such as the captured image of the outside of the vehicle 1, relative positions of the vehicle 1 to a preceding vehicle, the opposite vehicle, and a structural object, and relative speeds of the vehicle 1 to respective ones of them. The controller 71 may further predict a degree of coincidence of the initial direction of the development of the airbag 51 and a direction of input of an impact, and magnitude of the impact.

The controller 71 may also predict, on the basis of the information such as the captured image of the inside of the vehicle 1, presence or absence of the occupant, the seating position of the occupant, a body build or a body shape of the occupant, and body weight of the occupant. The controller 71 may further predict a degree of coincidence of a direction in which the occupant falls due to the impact and the initial direction of the development of the airbag 51, and a distance from the occupant to an interior member of the vehicle 1.

In this way, the controller 71 may predict or determine the collision mode.

The controller 71 may predict or determine the collision mode, not only in an ordinary state before the collision of the vehicle 1, but also upon the collision of the vehicle 1.

Thereafter, the controller 71 may determine, on the basis of the predicted collision mode, presence or absence of necessity of the rotation of the airbag module 50, and the rotation angle of the airbag module 50 (step ST2). The rotation angle may take either discrete values or continuous values.

When the collision mode predicted by the controller 71 is the side collision, the controller 71 may determine the presence or absence of the necessity of the rotation of the airbag module 50 that includes the inter-occupant airbag 51, and the rotation angle of the airbag module 50.

In this case, the controller 71 may determine the presence or absence of the necessity of the rotation of the airbag module 50, and the rotation angle of the airbag module 50, on the basis of the seating position of the occupant on the bench seat 28.

In one specific but non-limiting implementation, the controller 71 may determine the absence of the necessity of the rotation of the airbag module 50, when three occupants are seated on the bench seat 28.

The controller 71 may determine the presence of the necessity of the rotation of the airbag module 50 with the rotation angle of 90 degrees, when the seating positions solely on the outer sides of the bench seat 28 are occupied by the occupants.

Furthermore, when the occupant has the large body build, the controller 71 may decrease the rotation angle of the airbag module 50 in accordance with the body build of the occupant.

When the controller 71 determines the presence of the necessity of the rotation of the airbag module 50, the controller 71 may unlock the lock mechanism 68, to allow the actuator 61 to drive the airbag module 50 (step ST3). In one specific but non-limiting implementation, the controller 71 may allow the actuator 61 to cause the rotation of the airbag module 50, and allow the airbag 51 to be developed. This allows for the development of the airbag 51, not to generate a gap between the airbag 51 and the occupant seated on the bench seat 28. This also makes it possible to increase a thickness of the developed airbag 51 in a direction of input of a load of the occupant, allowing the developed airbag 51 to have the thickness large enough to resist the load of the occupant. Thereafter, the controller 71 may allow the lock mechanism 68 to be on operation. Thus, the airbag module 50 may be locked and kept from the rotation.

When the controller 71 determines the absence of the necessity of the rotation of the airbag module 50, the controller 71 may end the operation without driving the actuator 61.

As described, the controller 71 may allow the actuator 61 to cause the rotation of the airbag module 50 as appropriate before the collision of the vehicle 1. Meanwhile, the controller 71 may execute operation of collision determination separately from the operation illustrated in FIG. 4, to determine occurrence of the collision of the vehicle 1.

In the operation of the collision determination, the controller 71 may determine the occurrence of the collision of the vehicle 1, on the basis of various kinds of detection information supplied to the input output port.

If the collision of the vehicle 1 should occur, the controller 71 may supply the inflator 52 with an ignition signal. The controller 71 may adjust timing of output of the ignition signal to the inflator 52, to allow the occupant to come into contact with in the airbag 51. The timing of the output of the ignition signal to the inflator 52 may be set to one of the following: timing of the development of the airbag 51 to its maximum size; timing immediately before the airbag 51 comes to its maximum size; and timing immediately after the airbag 51 comes to its maximum size.

In the airbag module 50, the inflator 52 may be supplied with the ignition signal, and ignite the explosive to blow the high-pressure gas into the airbag 51. This allows for the development of the airbag 51. The airbag 51 may begin to be developed in response to the high-pressure gas flowing into the airbag 51. Then, the airbag 51 may break through the seat cover 43 with utilization of the breakers 81, and be developed to its maximum size. Thereafter, when inner pressure of the airbag 51 is further raised, the gas may begin to discharge from the airbag 51, causing shrinkage of the airbag 51. The airbag 51 thus developed may come into contact with the occupant, which provides better protection of the occupant, as compared to a case in which the occupant comes into contact with, for example, an interior member of the vehicle 1.

Moreover, the controller 71 may allow the actuator 61 to cause the rotation of the airbag module 50 as appropriate before the collision of the vehicle 1. This allows the airbag 51 having the shape elongated in one direction to be developed in a vertically-elongated three-dimensional shape, or to be developed in a horizontally-elongated three-dimensional shape. Since the airbag 51 has the anisotropic shape, the rotation of the airbag module 50 allows for a change in a thickness or a shape of the airbag 51 in the direction of the input of the impact.

As illustrated in FIG. 3A, when the three occupants are seated on the bench seat 28, the airbags 51 may be developed in an initial state, without being rotated. This allows the airbags 51 having the shapes elongated in one direction to be developed in the vertically-elongated three-dimensional shapes. In this case, it is possible to prevent the occupants from directly hitting one another.

As illustrated in FIG. 3B, when the seating positions solely on the outer sides of the bench seat 28 are occupied by the occupants, the airbags 51 may be developed in a rotated state from the initial state. This allows the airbags 51 to be developed, to prevent generation of gaps between the developed airbags 51 and the occupants seated at the seating positions on the outer sides of the bench seat 28. In this case, the airbags 51 may be developed in the horizontally-elongated three-dimensional shapes, causing an increase in the thicknesses of the airbags 51 in the horizontal direction. This makes it possible for the airbags 51 to resist the loads of the occupants and to support the occupants.

[Workings and Effects of the Protection Device]

As described, the protection device 2 according to the configuration example 1 may include the airbag 51 that may be developed in the region between the plurality of occupants seated on the bench seat 28. The airbag 51 may have the anisotropic shape. The rotation of the airbag module 50 may cause the change in the thickness or the shape of the airbag 51 in the direction of the input of the impact. The controller 71 may control the rotation of the airbag module 50 in accordance with the collision mode. This makes it possible to support the occupants with utilization of the airbag 51, regardless of the body build of the occupant, the number of the occupants, and the seating position of the occupant seated on the bench seat 28. Hence, it is possible to protect the occupant in the increased variety of collision modes, without installing additional airbags.

1-2. Configuration Example 2

A description is given next on a protection device 2 according to a configuration example 2.

The protection device 2 according to the configuration example 2 may include an airbag 51 that may be developed in front of the navigator's seat 24, unlike the protection device 2 according to the configuration example 1 as described. A configuration and operation of the protection device 2 according to the configuration example 2 may be similar to the configuration and the operation of the protection device 2 according to the configuration example 1, except for a configuration and operation described here.

The following description is given mainly on differences from the protection device 2 according to the configuration example 1. Components corresponding to those of the protection device 2 according to the configuration example 1 are denoted by same references, and description thereof is omitted.

Figure 5A:
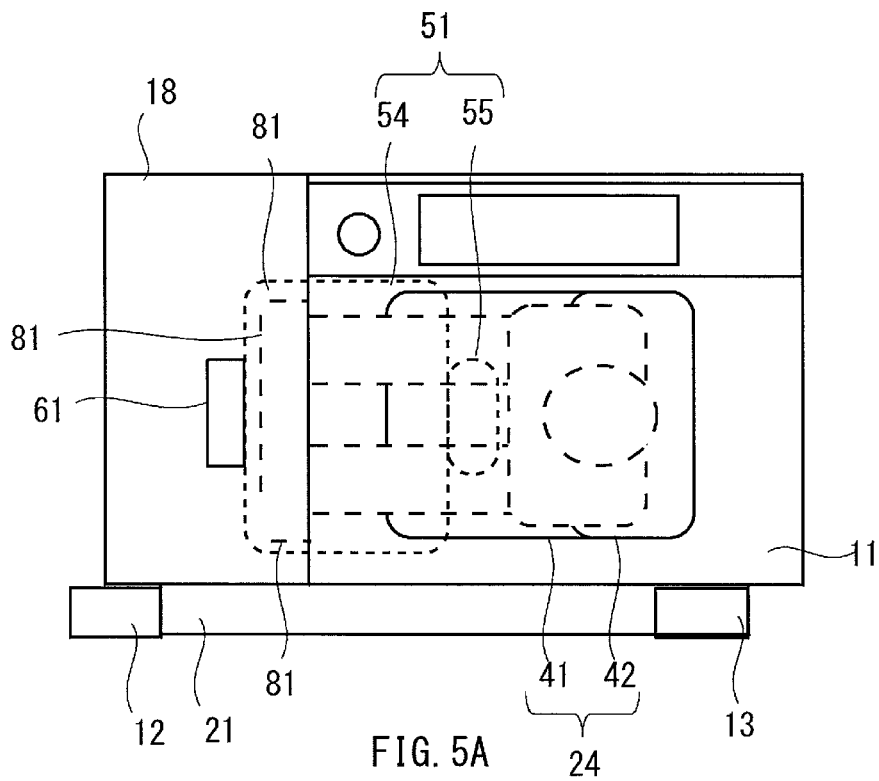
FIG. 5A is a top view, in an initial state, of arrangement of components of a vehicle occupant protection device according to a configuration example 2 of the first implementation of the technology.
Figure 5B:
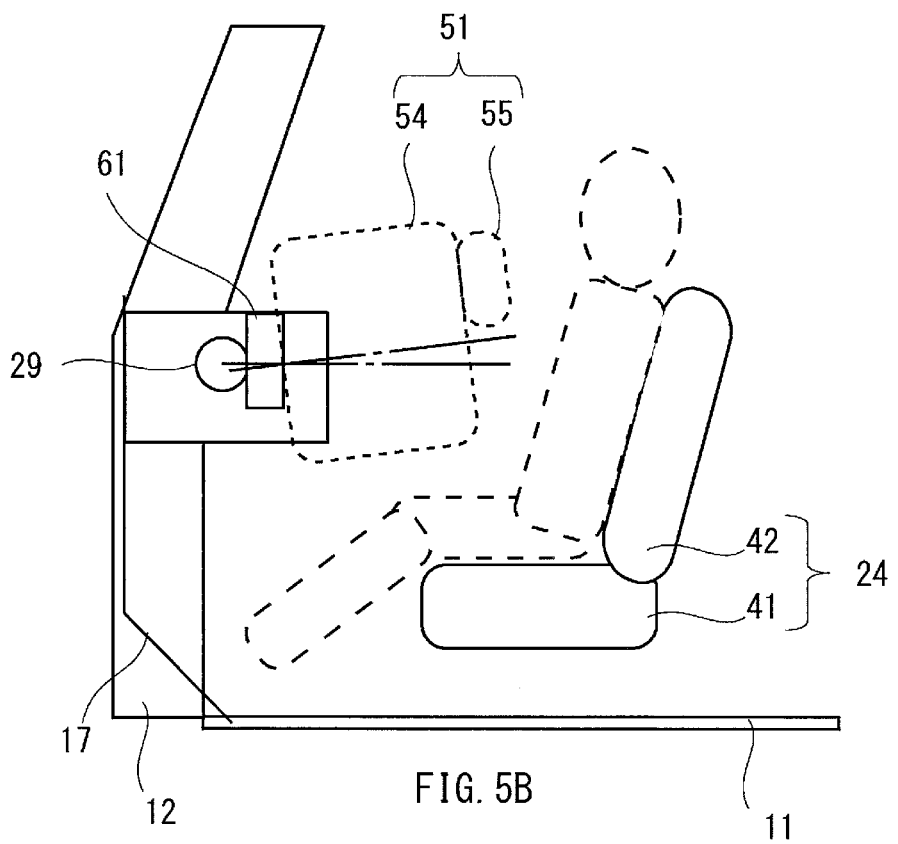
FIG. 5B is a side view, in the initial state, of the arrangement of the components of the vehicle occupant protection device according to the configuration example 2 of the first implementation of the technology.
Figure 6A:
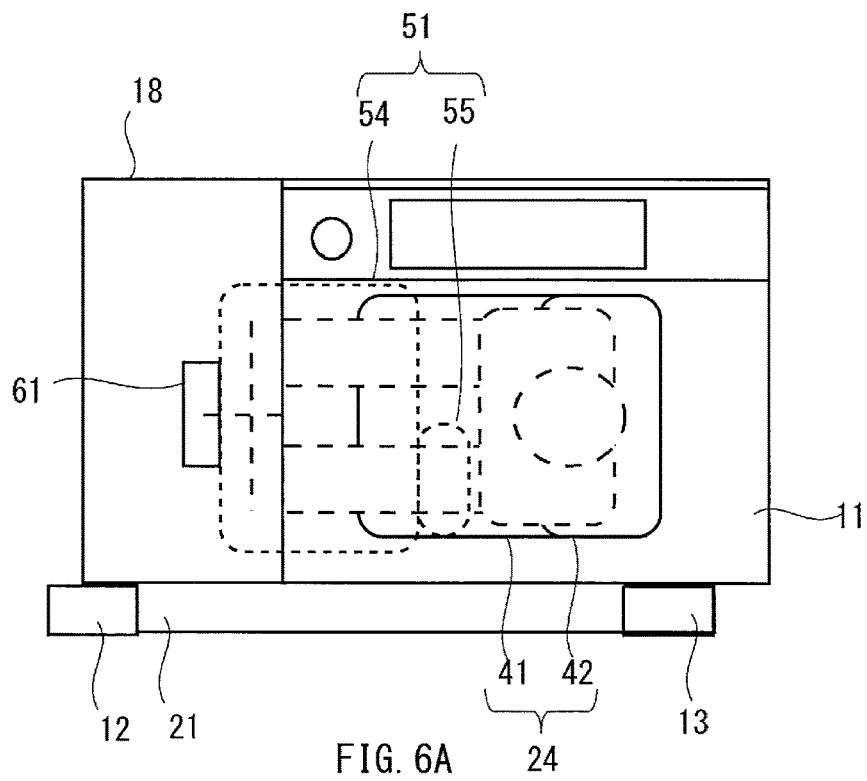
FIG. 6A is a top view, in a rotated state, of the arrangement of the components of the vehicle occupant protection device according to the configuration example 2 of the first implementation of the technology.
Figure 6B:
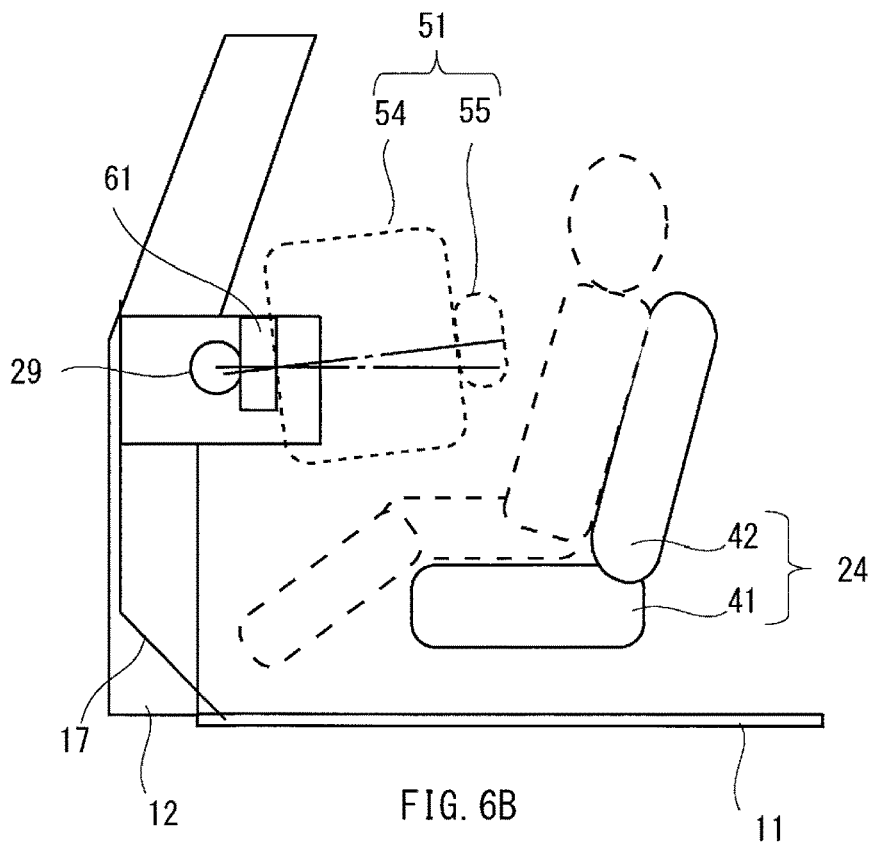
FIG. 6B is a side view, in the rotated state, of the arrangement of the components of the vehicle occupant protection device according to the configuration example 2 of the first implementation of the technology.

FIGS. 5A and 5B illustrate arrangement of components of the protection device 2 according to the configuration example 2, in the initial state. FIGS. 6A and 6B illustrate the arrangement of the components of the protection device 2 according to the configuration example 2, with the airbag module 50 rotated 90 degrees of the rotation angle. Note that FIGS. 5A and 6A are top views, whereas FIGS. 5B and 6B are side views.

The airbag module 50 may be installed, for example, in an inside of the dashboard 18. The airbag module 50 may be, therefore, disposed in front of the navigator's seat 24.

The rotation mechanism 62 may be attached to a steering support beam 29 that is installed in the inside of the dashboard 18. The steering support beam 29 may be extended from one of the pair of A pillars 12 to another of the pair of A pillars 12, and may be fixed to the pair of A pillars 12.

The airbag 51 may include a body 54 and a projection 55. The body 54 may have a three-dimensional shape elongated in a front-rear direction. The projection 55 may be projected rearward from the body 54. The projection 55 may be a part with which the airbag 51 may come into contact with the occupant, when the airbag 51 is developed. The module base 53 may be attached to the rotation mechanism 62, to allow the body 54 of the airbag 51 to be developed rearward in a direction that is slightly angled from the rotation axis of the airbag module 50. In one implementation, the direction that is slightly angled from the rotation axis of the airbag module 50 may serve as "the direction of the development". The airbag 51 may be developed with the module base 53 serving as the center. In the initial state, the airbag 51 may be developed toward the navigator's seat 24 from ahead of the navigator's seat 24. In a state in which the airbag module 50 is rotated 90 degrees of the rotation angle outwardly, i.e., in an outward direction from a center of the vehicle 1, the airbag 51 may be developed to be slightly inclined outwardly. This causes the projection 55 to move outwardly as seen from the navigator's seat 24. The rotation of the airbag module 50 may cause the direction of the development of the airbag 51 to change subtly around the rotation axis.

The dashboard 18 may have, for example, the plurality of breakers 81. The plurality of breakers 81 may be extended, for example, radially from the rotation axis. The plurality of breakers 81 may be disposed at the intervals of the predetermined rotation angle. Thus, the airbag 51 that has been developed inside the dashboard 18 may break through the dashboard 18 with utilization of the plurality of breakers 81, and be developed rearward from the dashboard 18.

In the following, the airbag 51 as described above is also referred to as a front airbag 51.

The protection device 2 according to the configuration example 2 may operate, for example, as follows. The operation of the controller 71, i.e., the overall procedure of the rotating operation of the airbag module 50, may be similar to the case as described with reference to FIG. 4.

Before the collision of the vehicle 1, the controller 71 may predict or determine the collision mode, on the basis of the input information that is inputted to the input output port (step ST1). The input information may indicate the internal and external situations of the vehicle 1.

Thereafter, the controller 71 may determine, on the basis of the predicted collision mode, the presence or absence of the necessity of the rotation of the airbag module 50, and the rotation angle of the airbag module 50 (step ST2). The rotation angle may take either discrete values or continuous values.

When the collision mode predicted by the controller 71 is the full-lap collision, the controller 71 may determine the presence or absence of the necessity of the rotation of the airbag module 50 that includes the front airbag 51, and the rotation angle of the airbag module 50. Thus, the controller 71 may determine the absence of the necessity of the rotation of the airbag module 50.

When the collision mode predicted by the controller 71 is the oblique collision, the controller 71 may determine the presence or absence of the necessity of the rotation of the airbag module 50 that includes the front airbag 51, and the rotation angle of the airbag module 50. Thus, the controller 71 may determine the presence of the necessity of the rotation of the airbag module 50. The controller 71 may determine the rotation angle of the airbag module 50, to allow a predetermined part, i.e., the projection 55, of the developed airbag 51 to come into contact with the occupant. In other words, the controller 71 may determine the rotation angle of the airbag module 50, to allow the airbag 51 to be developed with the projection 55 oriented in the direction of the input of the impact, or in the direction in which the occupant falls, allowing an impact-absorbing surface of the airbag 51 to come into contact with the occupant. The direction of the input of the impact may correspond to a predicted angle of the collision. The impact-absorbing surface of the airbag 51 may be defined as part or all of a surface of the projection 55. In one alternative, the controller 71 may determine the rotation angle of the airbag module 50, to allow a different position from the predetermined part, i.e., the projection 55, of the developed airbag 51 to come into contact with the occupant. Moreover, the controller 71 may make fine adjustment of the rotation angle of the airbag module 50, on the basis of the body build of the occupant or the body weight of the occupant, the predicted speed of the collision of the vehicle 1, and the predicted angle of the collision of the vehicle 1, to support the occupant with utilization of the projection 55.

When the controller 71 determines the presence of the necessity of the rotation of the airbag module 50, the controller 71 may unlock the lock mechanism 68, to allow the actuator 61 to drive the airbag module 50 (step ST3). In one specific but non-limiting implementation, the controller 71 may allow the actuator 61 to cause the rotation of the airbag module 50, and allow the airbag 51 to be developed. This allows for the development of the airbag 51, with the projection 55 oriented in the direction in which the occupant falls who is seated on the navigator's seat 24. Thereafter, the controller 71 may allow the lock mechanism 68 to be on operation. Thus, the airbag module 50 may be locked and kept from the rotation. In this case, the front airbag 51 may be developed as illustrated in FIGS. 6A and 6B.

When the controller 71 determines the absence of the necessity of the rotation of the airbag module 50, the controller 71 may end the operation without driving the actuator 61. In this case, the front airbag 51 may be developed as illustrated in FIGS. 5A and 5B.

As described, in the protection device 2 according to the configuration example 2, the controller 71 controls the rotation of the airbag module 50, to allow the airbag 51 to be developed, with the projection 55 oriented in the direction in which the occupant falls who is seated on the navigator's seat 24. The occupant may, therefore, fall to come into contact with the projection 55 of the developed airbag 51. In this case, regardless of the collision modes, the occupant may come into contact with the predetermined part, i.e., the projection 55, of the airbag 51. The projection 55 may serve as the impact-absorbing surface. This makes it possible to support the occupant with utilization of the projection 55 of the airbag 51, not only during the full-lap collision, but also during the offset collision or the oblique collision. Hence, it is possible to protect the occupant in the increased variety of collision modes, without installing additional airbags, similarly to the protection device 2 according to the configuration example 1 as described above.

1-3. Configuration Example 3

A description is given next on a protection device 2 according to a configuration example 3.

The protection device 2 according to the configuration example 3 may include an airbag 51 that may be developed in front of the navigator's seat 24, unlike the protection device 2 according to the configuration example 1 as described. A configuration and operation of the protection device 2 according to the configuration example 3 may be similar to the configuration and the operation of the protection device 2 according to the configuration example 1, except for a configuration and operation described here.

The following description is given mainly on differences from the protection device 2 according to the configuration example 1. Components corresponding to those of the protection device 2 according to the configuration example 1 are denoted by same references, and description thereof is omitted.

Figure 7A:
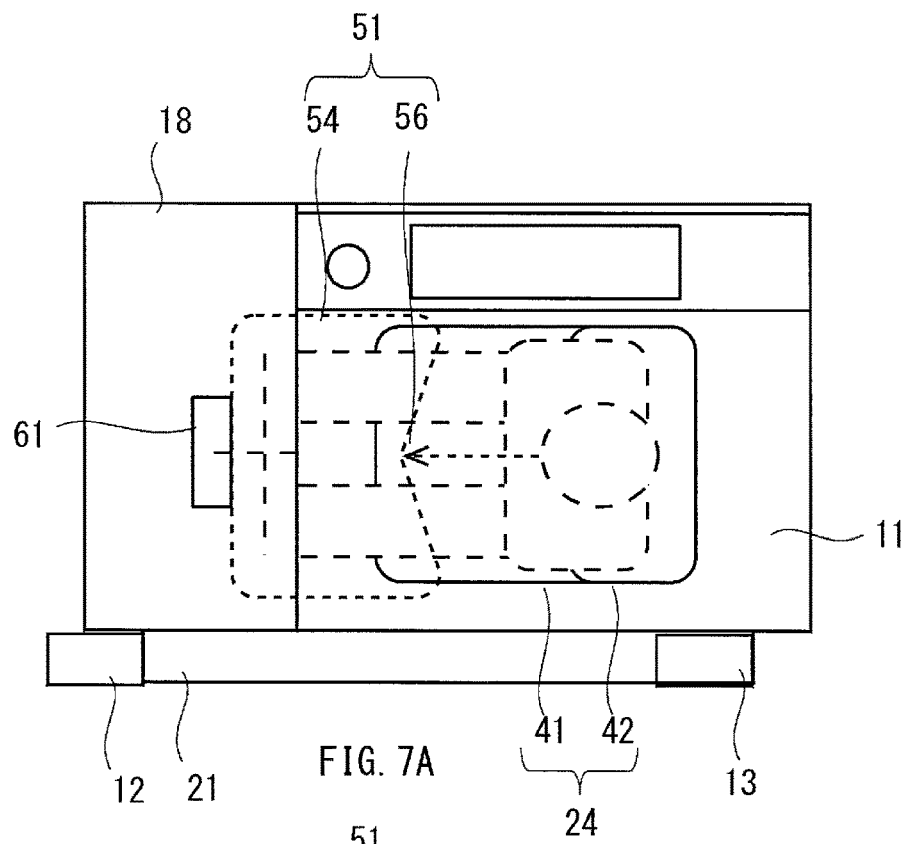
FIG. 7A is a top view, in an initial state, of arrangement of components of a vehicle occupant protection device according to a configuration example 3 of the first implementation of the technology.
Figure 7B:
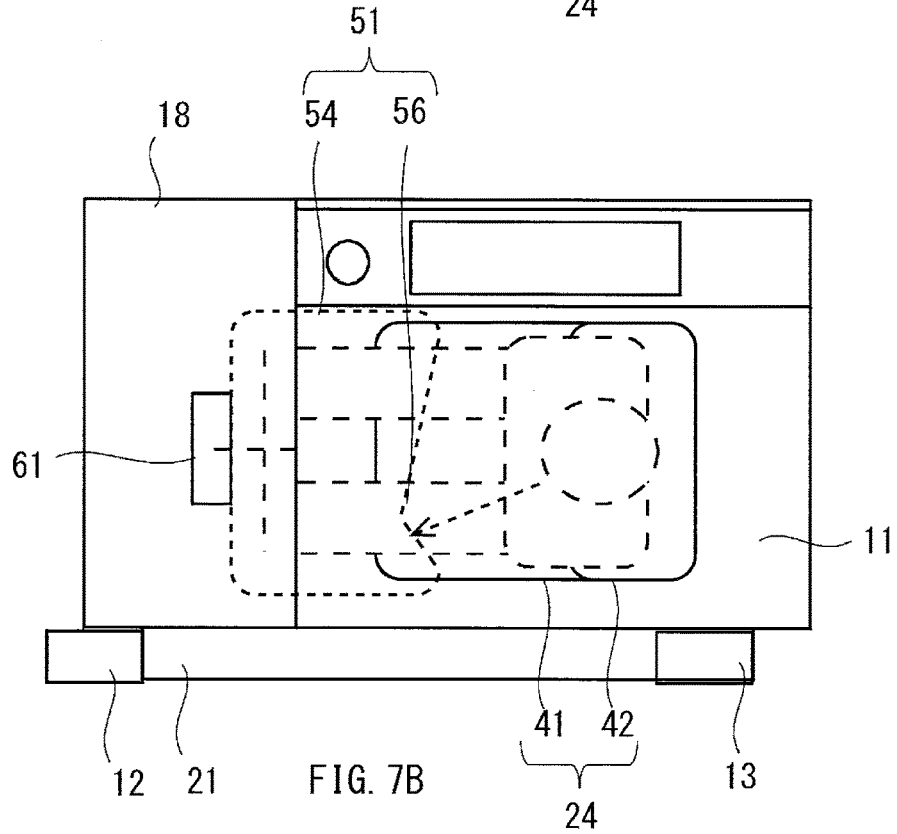
FIG. 7B is another top view, in a rotated state, of the arrangement of the components of the vehicle occupant protection device according to the configuration example 3 of the first implementation of the technology.

FIG. 7A illustrates arrangement of components of the protection device 2 according to the configuration example 3, in the initial state. FIG. 7B illustrates the arrangement of the components of the protection device 2 according to the configuration example 3, with the airbag module 50 rotated about 30 degrees of the rotation angle. Note that FIGS. 7A and 7B are top views.

The airbag 51 may have a body 54 and a recess 56. The body 54 may have the three-dimensional shape elongated in the front-rear direction, e.g., a substantially rectangular parallelepiped. The recess 56 may be provided in a rear center part of the body 54.

In the following, the airbag 51 as described above is also referred to as a front airbag 51.

The protection device 2 according to the configuration example 3 may operate, for example, as follows. The operation of the controller 71, i.e., the overall procedure of the rotating operation of the airbag module 50, may be similar to the case as described with reference to FIG. 4.

Before the collision of the vehicle 1, the controller 71 may predict or determine the collision mode, on the basis of the input information that is supplied to the input output port (step ST1). The input information may indicate the internal and external situations of the vehicle 1.

Thereafter, the controller 71 may determine, on the basis of the predicted collision mode, the presence or absence of the necessity of the rotation of the airbag module 50, and the rotation angle of the airbag module 50 (step ST2).

When the collision mode predicted by the controller 71 is the full-lap collision, the controller 71 may determine the presence or absence of the necessity of the rotation of the airbag module 50 that includes the front airbag 51, and the rotation angle of the airbag module 50. Thus, the controller 71 may determine the absence of the necessity of the rotation of the airbag module 50. In this case, a head of the occupant may come into contact with an inside, i.e., a deepest part, of the recess 56.

When the collision mode predicted by the controller 71 is the oblique collision, the controller 71 may determine the presence or absence of the necessity of the rotation of the airbag module 50 that includes the front airbag 51, and the rotation angle of the airbag module 50. Thus, the controller 71 may determine the presence of the necessity of the rotation of the airbag module 50. The controller 71 may determine the rotation angle of the airbag module 50, to allow the airbag 51 to be developed with the recess 56 oriented in the direction of the input of the impact, or in the direction in which the occupant falls. The direction of the input of the impact may correspond to the predicted angle of the collision. In other words, the controller 71 may determine the rotation angle of the airbag module 50, to allow the recess 56 to be oriented in the direction of the input of the impact, or in the direction in which the occupant falls, allowing the impact-absorbing surface of the airbag 51 to come into contact with the occupant. The impact-absorbing surface of the airbag 51 may be defined as part or all of a surface of the recess 56. Moreover, the controller 71 may make fine adjustment of the rotation angle of the airbag module 50, on the basis of the body build of the occupant or the body weight of the occupant, the predicted speed of the collision of the vehicle 1, and the predicted angle of the collision of the vehicle 1, to support the occupant with utilization of the recess 56. In one specific but non-limiting implementation, the controller 71 may make the fine adjustment of the rotation angle of the airbag module 50, to allow the inside, i.e., a side surface, of the recess 56 to come into contact with the head of the occupant, instead of the inside, i.e., the deepest part.

When the controller 71 determines the presence of the necessity of the rotation of the airbag module 50, the controller 71 may unlock the lock mechanism 68, to allow the actuator 61 to drive the airbag module 50 (step ST3). In one specific but non-limiting implementation, the controller 71 may allow the actuator 61 to cause the rotation of the airbag module 50, and allow the airbag 51 to be developed. This allows for the development of the airbag 51, with the recess 56 oriented in the direction in which the occupant falls who is seated on the navigator's seat 24. Thereafter, the controller 71 may allow the lock mechanism 68 to be on operation. Thus, the airbag module 50 may be locked and kept from the rotation.

When the controller 71 determines the absence of the necessity of the rotation of the airbag module 50, the controller 71 may end the operation without driving the actuator 61.

As described, in the protection device 2 according to the configuration example 3, the controller 71 may control the rotation of the airbag module 50, to allow the airbag 51 to be developed, with the recess 56 oriented in the direction in which the occupant falls who is seated on the navigator's seat 24. In this case, the occupant may fall, and come into contact with the recess 56 of the developed airbag 51. Moreover, it is possible to adjust, in accordance with the collision modes, the position of the inside of the recess 56 with which the head of the occupant comes in touch. This makes it possible to support the occupant with utilization of the recess 56 of the airbag 51, not only during the full-lap collision, but also during the offset collision or the oblique collision. Hence, it is possible to protect the occupant in the increased variety of collision modes, without installing additional airbags, similarly to the protection device 2 according to the configuration example 1 as described above.

1-4. Configuration Example 4

A description is given next on a protection device 2 according to a configuration example 4.

The protection device 2 according to the configuration example 4 may include an airbag 51 that may be developed sideward, or on lateral side, of the navigator's seat 24, unlike the protection device 2 according to the configuration example 1 as described. A configuration and operation of the protection device 2 according to the configuration example 4 may be similar to the configuration and the operation of the protection device 2 according to the configuration example 1, except for a configuration and operation described here.

The following description is given mainly on differences from the protection device 2 according to the configuration example 1. Components corresponding to those of the protection device 2 according to the configuration example 1 are denoted by same references, and description thereof is omitted.

Figure 8A:
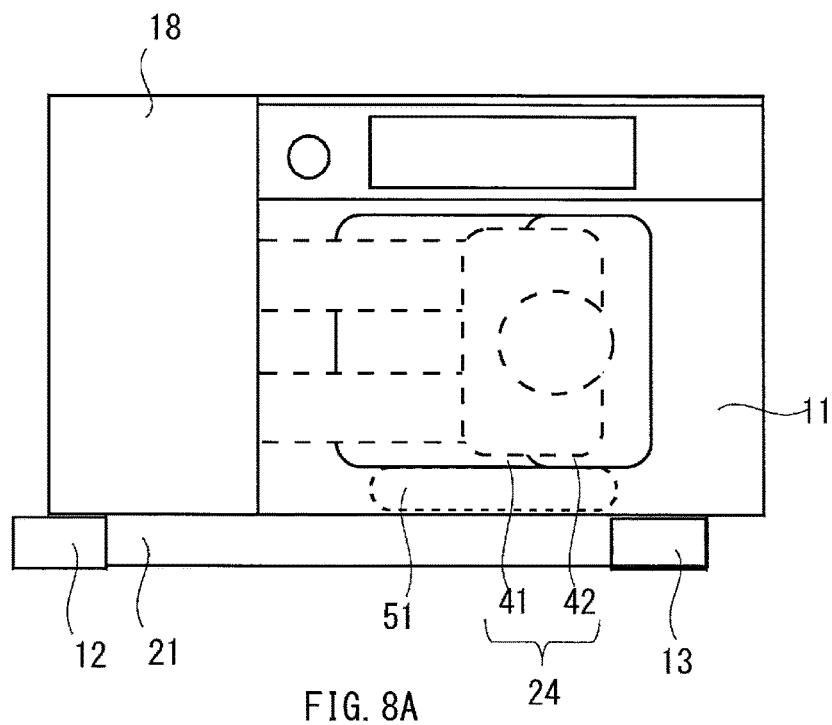
FIG. 8A is a top view, in a state with an adult occupant on board, of arrangement of components of a vehicle occupant protection device according to a configuration example 4 of the first implementation of the technology.
Figure 8B:
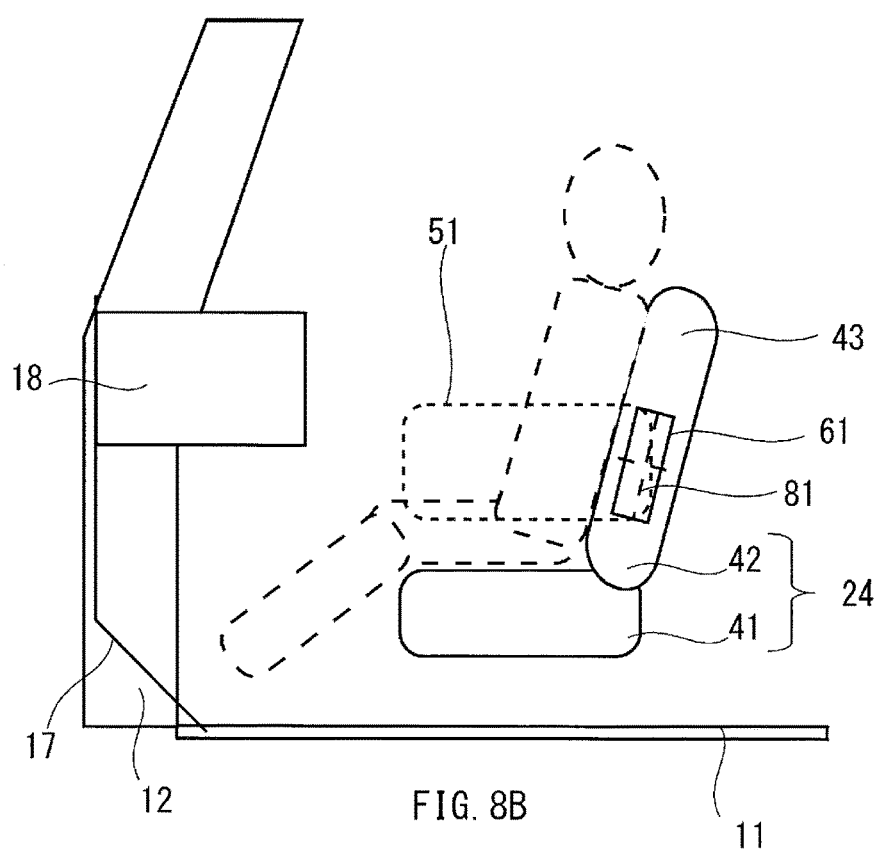
FIG. 8B is a side view, in the state with the adult occupant on board, of the arrangement of the components of the vehicle occupant protection device according to the configuration example 4 of the first implementation of the technology.
Figure 9:
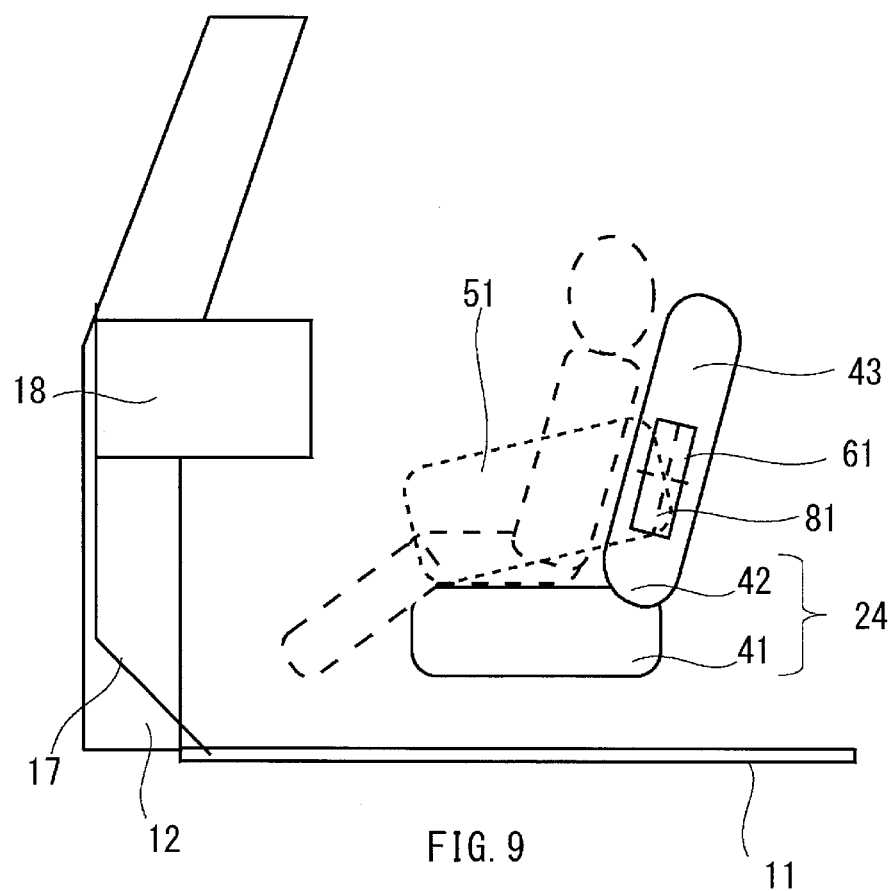
FIG. 9 is a side view, in a state with a juvenile occupant on board, of the arrangement of the components of the vehicle occupant protection device according to the configuration example 4 of the first implementation of the technology.

FIGS. 8A, 8B, and 9 illustrate arrangement of components of the protection device 2 according to the configuration example 4. FIGS. 8A and 8B illustrate a state with an adult occupant traveling in the vehicle 1. FIG. 9 illustrates a state with a juvenile occupant traveling in the vehicle 1. Note that FIG. 8A is a top view, whereas FIGS. 8B and 9 are side views.

The airbag module 50 may be installed in, for example, an inside of the backrest section 42 of the navigator's seat 24.

The rotation mechanism 62 may be attached to a substantially middle part of the backrest section 42, or the seat frame, in the vertical direction.

The airbag 51 may have the three-dimensional shape elongated in the front-rear direction, e.g., a substantially thin plate shape.

The module base 53 may be attached to the rotation mechanism 62, to allow the airbag 51 to be developed frontward in a direction substantially orthogonal to the rotation axis of the airbag module 50, i.e., the direction of the development. The airbag 51 may be developed with the module base 53 serving as the center. In the initial state, the airbag 51 may be developed horizontally frontward from the backrest section 42 of the navigator's seat 24. In a state with the airbag module 50 rotated the predetermined rotation angle, the airbag 51 may be developed in a direction that is inclined at the predetermined rotation angle with respect to the horizontal direction. The direction of the development of the airbag 51 may change subtly in accordance with the rotation of the airbag module 50.

The backrest section 42 of the navigator's seat 24 may include the seat cover 43. The seat cover 43 may have, for example, the plurality of breakers 81. Thus, the airbag 51 that has been developed inside the seat cover 43 may break through the seat cover 43 with utilization of the plurality of breakers 81, and be developed outwardly of the seat cover 43.

In the following, the airbag 51 as described above is also referred to as a side airbag 51.

The protection device 2 according to the configuration example 4 may operate, for example, as follows. The operation of the controller 71, i.e., the overall procedure of the rotating operation of the airbag module 50, may be similar to the case as described with reference to FIG. 4.

Before the collision of the vehicle 1, the controller 71 may predict or determine the collision mode, on the basis of the input information that is supplied to the input output port (step ST1). The input information may indicate the internal and external situations of the vehicle 1.

The controller 71 may predict, on the basis of the information such as the captured image of the inside of the vehicle 1, the seating position of the occupant, and the body build of the occupant or the body weight of the occupant. The controller 71 may further predict, on the basis of the information such as the captured image of the inside of the vehicle 1, the degree of coincidence of the direction in which the occupant falls due to the impact and the initial direction of the development of the airbag 51, and the distance from the occupant to the interior member of the vehicle 1.

Thereafter, the controller 71 may determine, on the basis of the predicted collision mode, the presence or absence of the necessity of the rotation of the airbag module 50, and the rotation angle of the airbag module 50 (step ST2). The rotation angle may take either discrete values or continuous values.

When the occupant has the regular body build, the controller 71 may determine the absence of the necessity of the rotation of the airbag module 50.

When the occupant has the small body build, the controller 71 may determine the presence of the necessity of the rotation of the airbag module 50 downward with the predetermined rotation angle of, for example, 10 degrees.

When the controller 71 determines the presence of the necessity of the rotation of the airbag module 50, the controller 71 may unlock the lock mechanism 68, to allow the actuator 61 to drive the airbag module 50 (step ST3). In one specific but non-limiting implementation, the controller 71 may allow the actuator 61 to cause the rotation of the airbag module 50, and allow the airbag 51 to be developed. Thereafter, the controller 71 may allow the lock mechanism 68 to be on operation. Thus, the airbag module 50 may be locked and kept from the rotation.

When the controller 71 determines the absence of the necessity of the rotation of the airbag module 50, the controller 71 may end the operation without driving the actuator 61.

In this way, it is possible to allow the airbag 51 to be developed in accordance with the body build of the occupant who is seated on the navigator's seat 24.

As described, in the protection device 2 according to the configuration example 4, the controller 71 may control the rotation of the airbag module 50, to allow the side airbag 51 to be developed in accordance with factors such as the body build of the occupant who is seated on the navigator's seat 24. This makes it possible to support the occupant with utilization of the side airbag 51 in consideration of the factors such as the body build of the occupant, regardless of the collision modes. Hence, it is possible to protect the occupant in the increased variety of collision modes, without installing additional airbags, similarly to the protection device 2 according to the configuration example 1 as described.

1-5. Configuration Example 5

A description is given next on a protection device 2 according to a configuration example 5.

The protection device 2 according to the configuration example 5 may include an inter-occupant airbag 51 that may be developed above the bench seat 28, unlike the protection device 2 according to the configuration example 1 as described.

The following description is given mainly on differences from the protection device 2 according to the configuration example 1. Components corresponding to those of the protection device 2 according to the configuration example 1 are denoted by same references, and description thereof is omitted.

Figure 10:
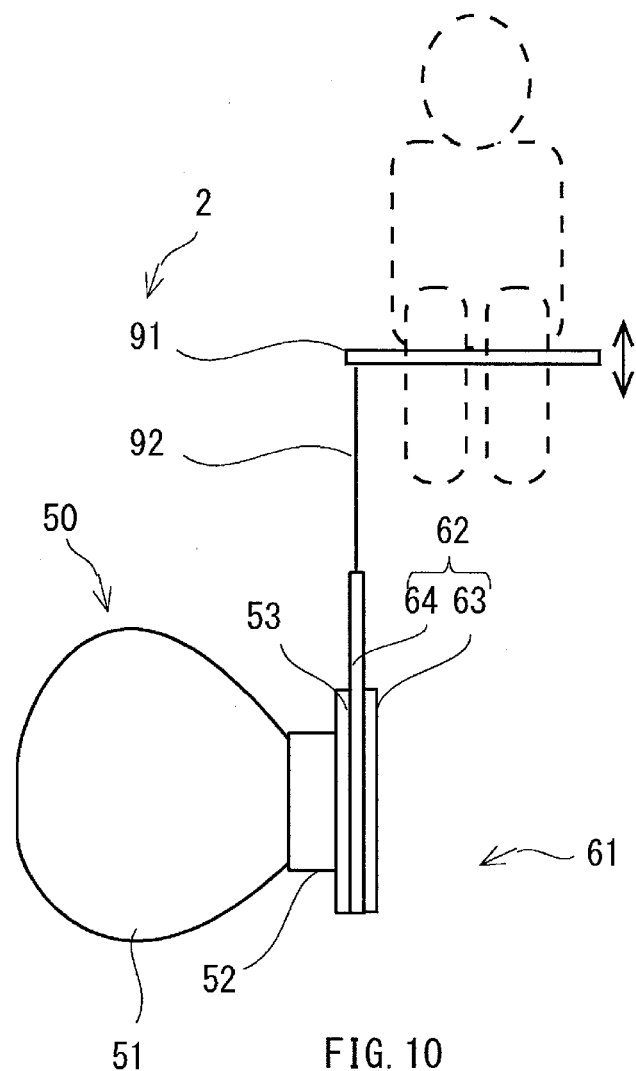
FIG. 10 is a front view of a configuration of a vehicle occupant protection device according to a configuration example 5 of the first implementation of the technology.

FIG. 10 illustrates a configuration of the protection device 2 according to the configuration example 5.

The actuator 61 may include the rotation mechanism 62, a displacement member 91, and a wire 92.

The displacement member 91 may be disposed in a substantially middle part of the bench seat 28, i.e., a middle seating position. The displacement member 91 may be embedded in the bench seat 28. The displacement member 91 may be displaced in accordance with weight of the occupant who is seated on the bench seat 28, or on the seating position.

The wire 92 may couple the displacement member 91 directly to the movable plate 64 of the rotation mechanism 62.

The configuration of the airbag module 50 may be similar to, for example, the case as illustrated in FIG. 3.

The airbag 51 may have, for example, the three-dimensional shape elongated in one direction. The airbag 51 may be developed, in the initial state, in the horizontally-elongated three-dimensional shape. In the state with the airbag module 50 rotated 90 degrees of the rotation angle, the airbag 51 may be developed in the vertically-elongated three-dimensional shape.

The protection device 2 according to the configuration example 5 may operate, for example, as follows. The operation of the controller 71, i.e., the overall procedure of the rotating operation of the airbag module 50, may be similar to the case as described with reference to FIG. 4.

When the seating position at the substantially middle of the bench seat 28 is occupied by the occupant, the displacement member 91 may be displaced in accordance with the weight of the occupant. The wire 92 may cause the movable plate 64 of the rotation mechanism 62 to rotate in accordance with the displacement of the displacement member 91.

When the seating position at the substantially middle of the bench seat 28 is not occupied by the occupant, the movable plate 64 of the rotation mechanism 62 may not be rotated. The airbag 51 may be, therefore, developed in the horizontally-elongated three-dimensional shape.

When the seating position at the substantially middle of the bench seat 28 is occupied by the occupant, the movable plate 64 of the rotation mechanism 62 may be rotated 90 degrees of the rotation angle. The airbag 51 may be therefore developed in the vertically-elongated three-dimensional shape.

Hence, it is possible to protect the occupant in the increased variety of collision modes, without installing additional airbags, similarly to the protection device 2 according to the configuration example 1.

[2. Vehicle Occupant Protection Device according to Second Implementation]

A description is given next on a protection device according to a second implementation of the technology. The protection device may have any one of configurations as described in the following configuration examples 1 to 3.

2-1. Configuration Example 1

First, a description is given of a protection device 102 according to a configuration example 1.
[Configuration of Vehicle to which Protection Device is Applied]

The protection device 102 according to the configuration example 1 may be applied to a vehicle 101. The vehicle 101 may have a configuration, for example, as described below.

Figure 11A:
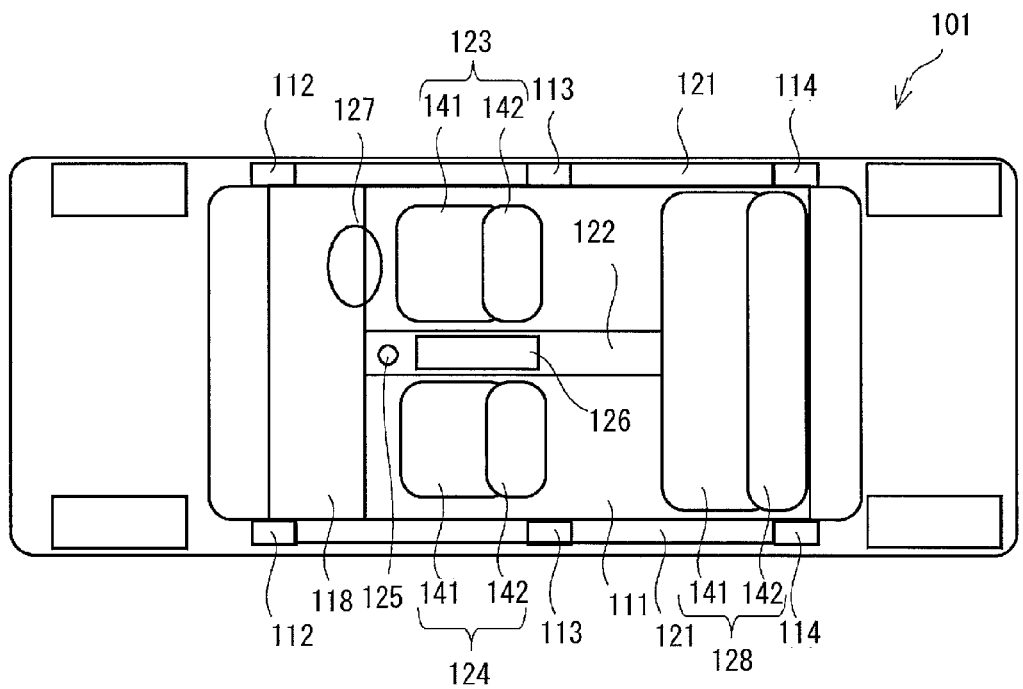
FIG. 11A is a schematic top view of a configuration of a vehicle to which a vehicle occupant protection device according to a configuration example 1 of a second implementation of the technology is applied.
Figure 11B:
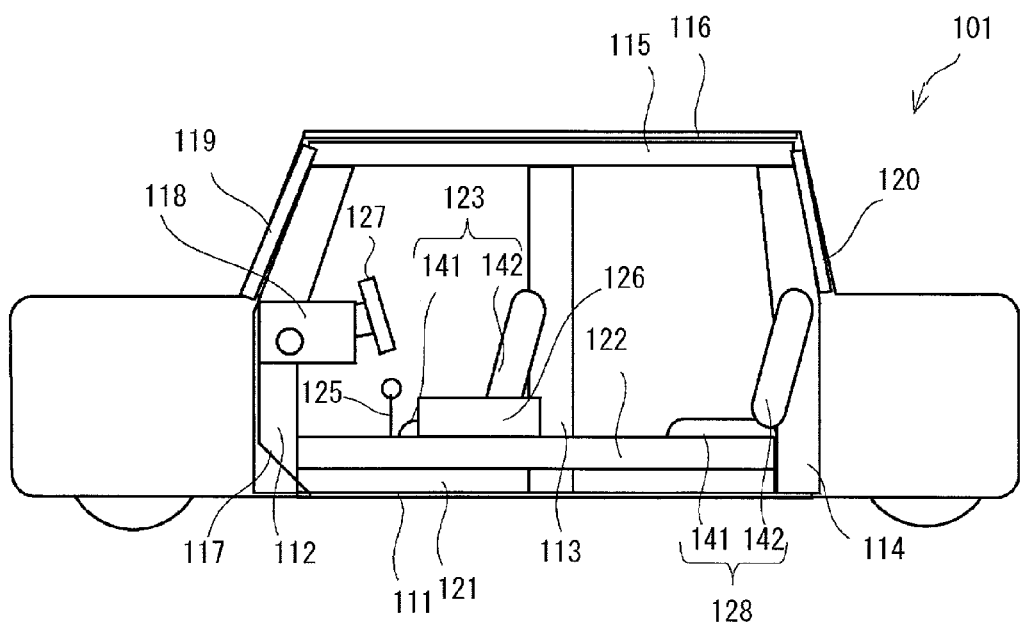
FIG. 11B is a schematic side view of the configuration of the vehicle to which the vehicle occupant protection device according to the configuration example 1 of the second implementation of the technology is applied.

FIGS. 11A and 11B schematically illustrate the configuration of the vehicle 101 to which the protection device 102 according to the configuration example 1 is applied. FIG. 11A is a top view of the vehicle 101, and FIG. 11B is a side view of the vehicle 101.

The configuration of the vehicle 101 may be, for example, substantially similar to the configuration of the vehicle 1 as described in the first implementation with reference to FIGS. 1A and 1B.

In one specific but non-limiting implementation, the vehicle 101 may be provided with the occupant compartment, the front chamber, and the rear chamber. The occupant compartment may include a floor panel 111, a pair of A pillars 112, a pair of B pillars 113, and a pair of C pillars 114. The pair of A pillars 112 and the pair of C pillars 114 may be coupled together by a pair of roof rails 115. A roof panel 116 may be joined to the pair of roof rails 115.

A toe board 117, for example, may be disposed between the floor panel 111 and the pair of A pillars 112. A dashboard 118, for example, may be disposed above the toe board 117. A windshield 119 may be fitted in space surrounded by the dashboard 118, the pair of A pillars 112, and the roof panel 116. A rear window 120 may be fitted in space between the pair of C pillars 114. A pair of side sills 121 may be joined to two sides of the floor panel 111 in the widthwise direction.

The floor panel 111 may be provided with, for example, a center tunnel 122. Components such as the drive shaft may be disposed below the center tunnel 122.

A front part of the floor panel 111 may be furnished with the front seats. The front seats may include, for example, the two seats, e.g., a driver's seat 123 and a navigator's seat 124. The driver's seat 123 may include, for example, a seating section 141, and a backrest section 142 attached to the seating section 141. The navigator's seat 124 may include, for example, the seating section 141 and the backrest section 142, similarly to the driver's seat 123 as mentioned above. The center tunnel 122 as mentioned above may be disposed between the driver's seat 123 and the navigator's seat 124. Components such as a shift lever 125, the parking brake lever, and a console box 126 may be disposed above the center tunnel 122. In one implementation, the console box 126 may serve as an "interior member".

The dashboard 118, for example, may be disposed in front of the driver's seat 123 and the navigator's seat 124. A steering wheel 127 may be disposed in front of the driver's seat 123.

A rear part of the floor panel 111 may be furnished with the rear seat. The rear seat may include, for example, the one seat, e.g., a bench seat 128. The bench seat 128 may include, for example, the seating section 141 and the backrest section 142, similarly to the driver's seat 123 as mentioned above. The bench seat 128 may have a width equivalent to, for example, a width of the floor panel 111.

[Configuration of Protection Device]

The protection device 102 may be mounted on the vehicle 101, and designed to protect the occupants or other conveyance objects if a collision should occur.

Figure 12:
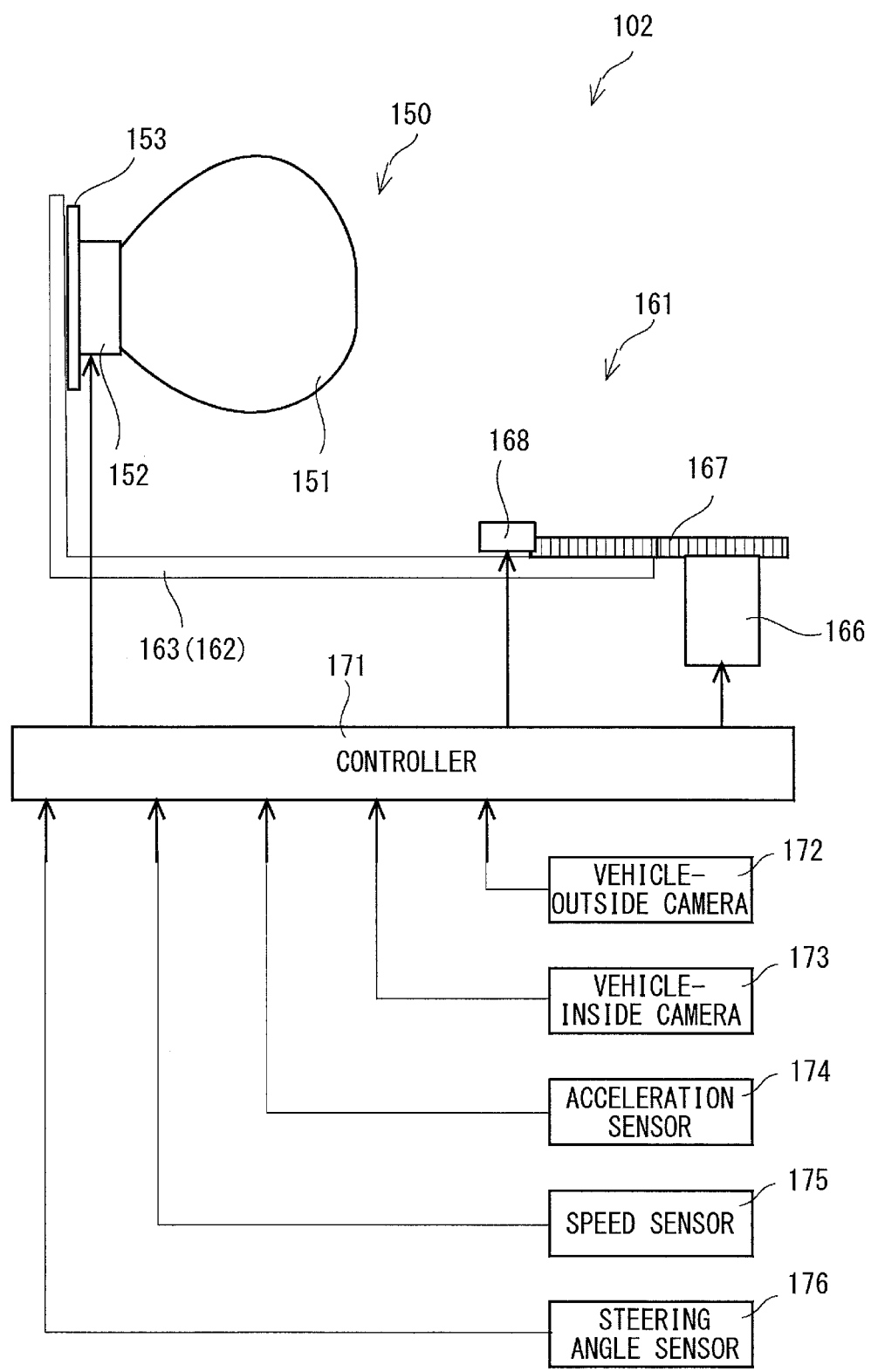
FIG. 12 illustrates a configuration of the vehicle occupant protection device according to the configuration example 1 of the second implementation of the technology.

FIG. 12 illustrates a configuration of the protection device 102 according to the configuration example 1.

The protection device 102 may include, an airbag module 150, an actuator 161, and a controller 171.

The airbag module 150 may include an airbag 151, an inflator 152, and a module base 153.

The airbag 151 may be made of, for example, cloth that is sewn in the bag shape.

The inflator 152 may include, for example, the small-sized tank that may store substances such as the explosive and the high-pressure gas. The inflator 152 allows the airbag 151 to develop. The inflator 152 may be coupled to the airbag 151.

The module base 153 may include, for example, the metal plate. The airbag 151, the inflator 152, and other members may be fixed to the module base 153.

The airbag 151 may be developed from the module base 153 toward the predetermined direction, i.e., the direction of the development.

The actuator 161 attaches the airbag module 150 to the vehicle 101, to cause a change in relative positional relation between the vehicle 101 and the airbag module 150. In one specific but non-limiting implementation, the actuator 161 may cause turning of the airbag module 150. The turning of the airbag module 150 may involve movement of the airbag module 150 with a change in orientation. The actuator 161 may include a turning mechanism 162, a driving motor 166, a link mechanism 167, and a lock mechanism 168.

The turning mechanism 162 may attach the airbag module 150 to the vehicle 101, to cause the turning of the airbag module 150. The turning mechanism 162 may include an L-shaped arm 163. The L-shaped arm 163 may be attached to the vehicle 101 to allow one end, i.e., a first end, of the L-shaped arm 163 to be turned with respect to the vehicle 101. The module base 153 of the airbag module 150 may be fixed to the other end, i.e., a second end of the L-shaped arm 163. Thus, the actuator 161 attaches the airbag module 150 to the vehicle 101, to cause the turning of the airbag module 150 around a turning axis of the turning mechanism 162.

The driving motor 166 may include, for example, a direct-current motor. The driving motor 166 may be attached to the vehicle 101.

The link mechanism 167 may include, for example, a plurality of gears. The link mechanism 167 may be disposed between the driving motor 166 and the L-shaped arm 163. This allows the L-shaped arm 163 to be turned with utilization of driving force of the driving motor 166, causing the airbag module 150 to be turned relatively to the vehicle 101. In this way, the link mechanism 167 may cause the turning of the airbag module 150. In one alternative, the link mechanism 167 may couple the driving motor 166 and the L-shaped arm 163 through a wire. In this alternative, the wire may be driven by the controller 171, and the link mechanism 167 may cause the turning of the airbag module 150 with utilization of the wire.

The lock mechanism 168 may lock the turning of the airbag module 150 when the airbag 151 is developed. The lock mechanism 168 may include, for example, a hook that is provided on the vehicle 101. The lock mechanism 168 may allow the hook to be hooked on the L-shaped arm 163 before the airbag 151 is developed, to inhibit the turning of the airbag module 150. Thus, the airbag module 150 allows the airbag 151 to be developed in a state in which the change in the relative positional relation between the vehicle 101 and the airbag module 150 is caused by the actuator 161. In one specific but non-limiting implementation, the airbag module 150 may allow the airbag 151 to be developed, with utilization of the driving motor 166, in a state in which the airbag module 150 is turned to a predetermined position, i.e., a position of turning.

Figure 13A:
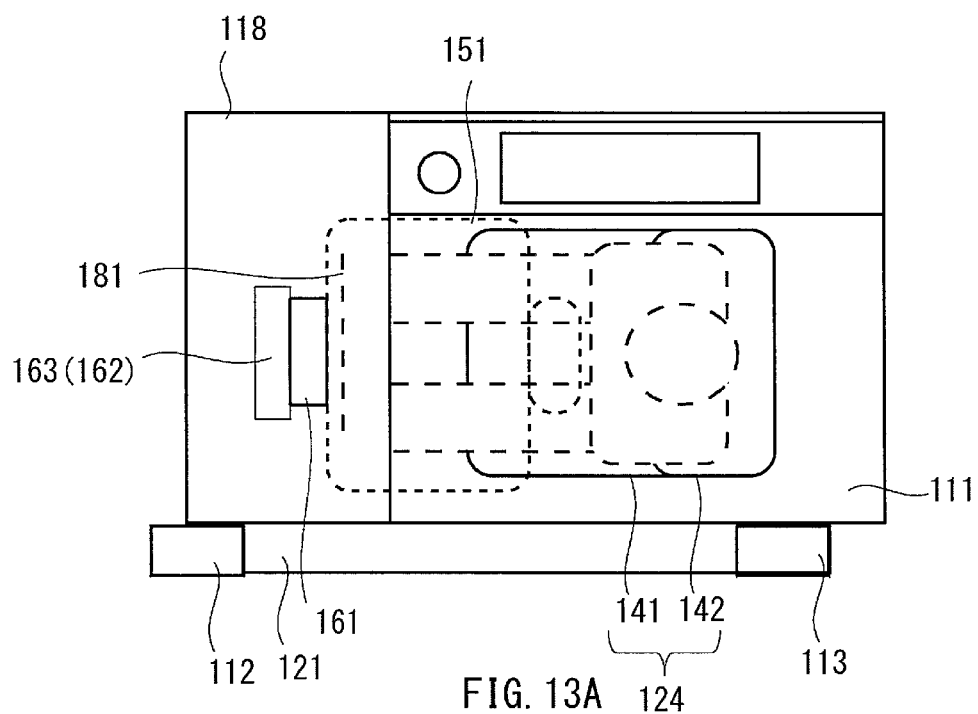
FIG. 13A is a top view of arrangement of components of the vehicle occupant protection device illustrated in FIG. 12.
Figure 13B:
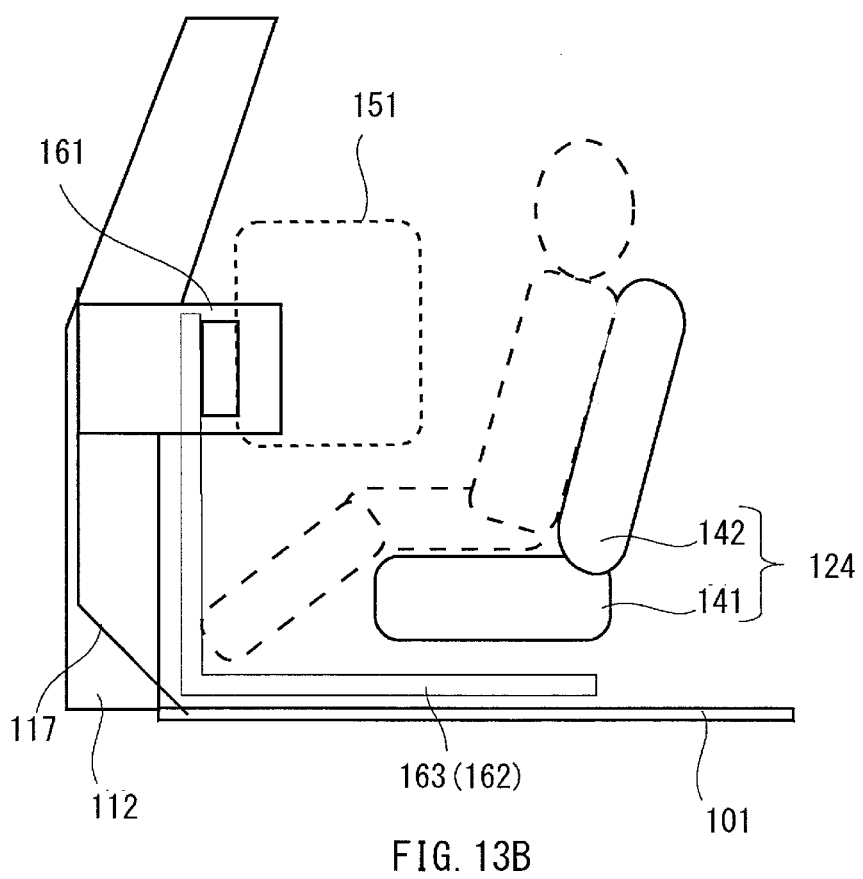
FIG. 13B is a side view of the arrangement of the components of the vehicle occupant protection device illustrated in FIG. 12.

FIGS. 13A and 13B illustrate arrangement of components of the protection device 102 illustrated in FIG. 12. Note that FIG. 13A is a top view, and FIG. 13B is a side view.

The airbag module 150 may be installed in, for example, an inside of the dashboard 118. In one implementation, the dashboard 118 may serve as an "interior member" of the vehicle 101.

The L-shaped arm 163 of the actuator 161 may be fixed to the floor panel 111, to allow the first end of the L-shaped arm 163 to be positioned below the navigator's seat 124. The first end of the L-shaped arm 163 may be attached to the vehicle 101. The L-shaped arm 163 may be extended frontward from the navigator's seat 124, and bent toward the inside of the dashboard 118. The airbag module 150 may be attached to the second end of the L-shaped arm 163, in the inside of the dashboard 118, in rearward orientation with respect to the second end of the L-shaped arm 163. In the initial state, the L-shaped arm 163 may be extended straightly frontward from the navigator's seat 124. In the initial state, the airbag module 150 may be directly confronted with the navigator's seat 124 in front of the navigator's seat 124. The L-shaped arm 163 may be driven with utilization of the driving motor 166, and turned leftward or rightward with the navigator's seat 124 serving as a center of turning. The airbag module 150 may be moved along a circumferential direction around the seating position of the navigator's seat 124 on which the occupant is seated.

The airbag 151 may have the three-dimensional shape elongated in the front-rear direction, e.g., a substantially rectangular parallelepiped. The module base 153 may be attached to the turning mechanism 162, to allow the airbag 151 to be developed straightly toward the navigator's seat 124. This makes it possible to keep the airbag 151 confronted with the navigator's seat 124, even when the L-shaped arm 163 of the actuator 161 is turned leftward or rightward from an initial position. Even when the L-shaped arm 163 is turned outwardly from the initial position, the airbag 151 may be oriented toward the occupant who is seated near a middle of an inside of the vehicle 101.

The dashboard 118 may have, for example, a plurality of breakers 181 that may selectively break in accordance with the turning of the airbag module 150. The plurality of breakers 181 may be extended widthwise within a range of movement of the airbag module 150 disposed in the inside of the dashboard 118. Thus, the airbag 151 that has been developed inside the dashboard 118 may selectively break through the dashboard 118 with utilization of the breakers 181, and be developed rearward from the dashboard 118.

In the following, the airbag 151 as described above is also referred to as a front airbag 151.

The controller 171 determines a collision mode of the vehicle 101 as described later. The controller 171 also controls the relative positional relation between the vehicle 101 and the airbag module 150. The relative positional relation between the vehicle 101 and the airbag module 150 is changed by the actuator 161. The controller 171 may include, for example, the microcomputer. The microcomputer may include components such as the CPU, the ROM, the RAM, the input output port, and the system bus that couples the forgoing components. The ROM may store, for example, the program that may control operation of the protection device 102. The CPU may perform, as its main operation, the loading of the program stored in the ROM into the RAM, and the execution of the program. Thus, the microcomputer may serve as the controller 171 of the protection device 102.

The inflator 152, the driving motor 166, the lock mechanism 168, the various detectors, and other components may be coupled to the input output port. The various detectors may include, for example, a vehicle-outside camera 172, a vehicle-inside camera 173, an acceleration sensor 174, a speed sensor 175, and a steering angle sensor 176. The vehicle-outside camera 172 may capture, from inside the occupant compartment, an image of an outside of the vehicle 101, e.g., an image ahead of the vehicle 101. The vehicle-inside camera 173 may capture an image of the inside of the vehicle 101. The controller 171 may control operation of the protection device 102, on the basis of information supplied from the various detectors as exemplified above. The controller 171 may control the turning of the airbag module 150 caused by the actuator 161.

[Operation of Protection Device]

The protection device 102 according to the configuration example 1 may operate, for example, as follows.

Figure 14:
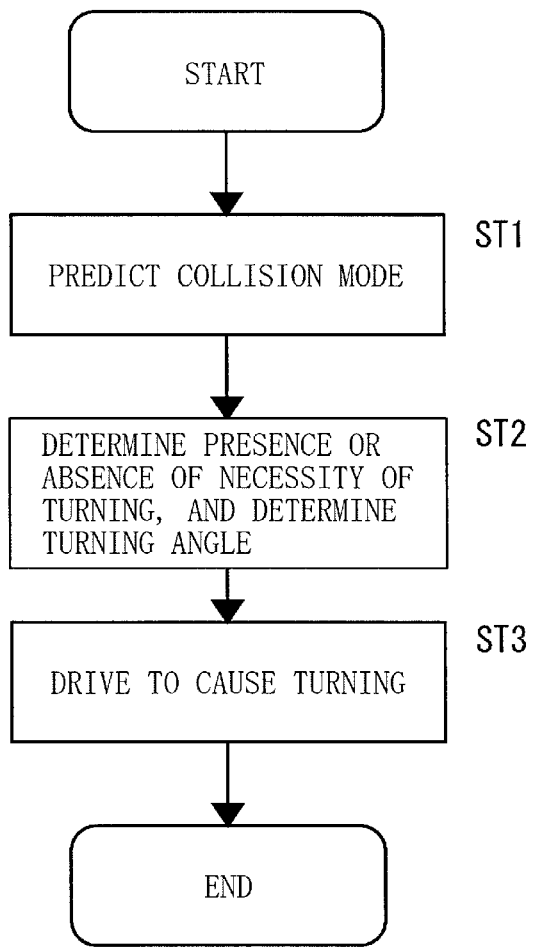
FIG. 14 is a flowchart that illustrates operation of a controller illustrated in FIG. 12, that is, a procedure of turning operation of an airbag module.

FIG. 14 is a flowchart that illustrates operation of the controller 171 illustrated in FIG. 12, i.e., a procedure of turning operation of the airbag module 150. The controller 171 may periodically execute the operation illustrated in FIG. 14.

Before a collision of the vehicle 101, the controller 171 may predict or determine a collision mode, on the basis of input information that is inputted to the input output port (step ST1). The input information may indicate internal and external situations of the vehicle 101.

Here, the input information that may indicate the internal and external situations of the vehicle 101 may include, for example, one kind, or two or more kinds of the following: input information used in prediction of the collision mode of the vehicle 101; input information upon the collision of the vehicle 101; and input information that indicates the internal situation and the external situation of the vehicle 101. Non-limiting examples of the input information used in the prediction of the collision mode of the vehicle 101 may include the captured image of the outside of the vehicle 101. Non-limiting examples of the input information that indicates the internal situation and the external situation of the vehicle 101 may include the captured image of the inside of the vehicle 101.

Non-limiting examples of the collision mode may include the full-lap collision, the offset collision, the oblique collision, and the side collision, similarly to the first implementation as described. The differences among these collision modes may cause a change in behavior of the vehicle 101 and behavior of the occupants upon the collision.

The controller 171 may, therefore, firstly, predict or determine the collision mode, on the basis of the input information on the internal and external situations of the vehicle 101, in predicting or determining the collision mode before the collision of the vehicle 101.

In one specific but non-limiting implementation, the controller 171 may predict, on the basis of the information such as the captured image of the outside of the vehicle 101, relative positions of the vehicle 101 to the preceding vehicle, the opposite vehicle, and the structural object, and relative speeds of the vehicle 101 to respective ones of them. The controller 171 may further predict the degree of coincidence of the initial direction of the development of the airbag 151 and the direction of the input of the impact, and the magnitude of the impact.

The controller 171 may also predict, on the basis of the information such as the captured image of the inside of the vehicle 101, presence or absence of the occupant, the seating position of the occupant, the body build or the body shape of the occupant, and the body weight of the occupant. The controller 171 may further predict the degree of coincidence of the direction in which the occupant falls due to the impact and the initial direction of the development of the airbag 151, and the distance from the occupant to the interior member of the vehicle 101.

In this way, the controller 171 may predict or determine the collision mode.

The controller 171 may predict or determine the collision mode, not only in the ordinary state before the collision of the vehicle 101, but also upon the collision of the vehicle 101.

Thereafter, the controller 171 may determine, on the basis of the predicted collision mode, presence or absence of necessity of the turning of the airbag module 150, and a turning angle of the airbag module 150 (step ST2). The turning angle may take either discrete values or continuous values.

When the collision mode predicted by the controller 171 is the full-lap collision, the controller 171 may determine the absence of the necessity of the turning of the airbag module 150 that includes the front air bag 151.

When the collision mode predicted by the controller 171 is the oblique collision, the controller 171 may determine the presence of the necessity of the turning of the airbag module 150 that includes the front airbag 151.

Moreover, the controller 171 may determine the turning angle of the airbag module 150. The controller 171 may determine the turning angle, to allow the airbag module 150 to be turned to a position on a line that connects a collision-predicted part of the vehicle 101 and the head of the occupant.

When the occupant has the large body build, the controller 171 may increase or decrease the turning angle of the airbag module 150, in accordance with the body build of the occupant. In one specific but non-limiting implementation, the controller 171 may decrease the turning angle when the occupant has the large body build, in consideration of possibility of an increased distortion of the airbag 151.

When the controller 171 determines the presence of the necessity of the turning of the airbag module 150, the controller 171 may unlock the lock mechanism 168 to allow the actuator 161 to drive the airbag module 150 (step ST3). In one specific but non-limiting implementation, the controller 171 may allow the actuator 161 to cause the turning of the airbag module 150, and allow the airbag 151 to be developed. This allows the airbag 151 to be developed toward the occupant, in the direction in which the occupant falls who is seated on the navigator's seat 124. Thereafter, the controller 171 may allow the lock mechanism 168 to be on operation. Thus, the airbag module 150 may be locked and kept from the turning, at the position to which the airbag module 150 is turned.

When the controller 171 determines the absence of the necessity of the turning of the airbag module 150, the controller 171 may end the operation without driving the actuator 161.

As described, the controller 171 may allow the actuator 161 to cause the turning of the airbag module 150 as appropriate before the collision of the vehicle 101. Meanwhile, the controller 171 may execute the operation of collision determination separately from the operation illustrated in FIG. 14, to determine the occurrence of the collision of the vehicle 101.

In the operation of the collision determination, the controller 171 may determine the occurrence of the collision, on the basis of the various kinds of detection information supplied to the input output port.

If the collision of the vehicle 101 should occur, the controller 171 may supply the inflator 152 with an ignition signal. The controller 171 may adjust the timing of output of the ignition signal to the inflator 152, to allow the occupant to come into contact with the airbag 151. The timing of the output of the ignition signal to the inflator 152 may be set to one of the following: timing of the development of the airbag 151 to its maximum size; timing immediately before the airbag 151 comes to its maximum size; and timing immediately after the airbag 151 comes to its maximum size.

In the airbag module 150, the inflator 152 may be supplied with the ignition signal, and ignite the explosive to blow the high-pressure gas into the airbag 151. This allows for the development of the airbag 151. The airbag 151 may begin to be developed in response to the high-pressure gas flowing into the airbag 151. Then, the airbag 151 may break through the dashboard 118 with utilization of the breakers 181, and be developed to its maximum size. Thereafter, when the inner pressure of the airbag 151 is further raised, the gas may begin to discharge from the airbag 151, causing the shrinkage of the airbag 151. The airbag 151 thus developed may come into contact with the occupant, which provides the better protection of the occupant, as compared to the case in which the occupant comes into contact with, for example, the interior member of the vehicle 101.

Moreover, the actuator 161 may cause the turning of the airbag module 150 as appropriate before the collision of the vehicle 101. This allows the airbag 151 to be developed toward the occupant who is seated on the navigator's seat 124, in the direction in which the occupant falls, no matter which direction the occupant falls in.

When the collision mode is the full-lap collision, the controller 171 may allow the airbag 151 to be developed rearward from front of the navigator's seat 124.

When the collision mode is the oblique collision, the controller 171 may allow the airbag 151 to be developed toward the occupant who is seated on the navigator's seat 124, in the direction in which the occupant falls. The occupant who is seated on the navigator's seat 124 may be positioned obliquely rearward as seen in the direction in which the occupant falls.

[Workings and Effects of Protection Device]

As described, in the protection device 102 according to the configuration example 1, the airbag module 150 may be turned along the circumferential direction around the occupant who is seated on the navigator's seat 124. The airbag 151 may be developed toward the occupant who is seated on the navigator's seat 124, in the direction in which the occupant falls, regardless of the collision modes. This makes it possible to support the occupant with utilization of the airbag 151 that may be developed in the direction confronted with the occupant, not only during the full-lap collision, but also during the offset collision or the oblique collision, for example. Hence, it is possible to protect the occupant in the increased variety of collision modes, without installing additional airbags, similarly to the first implementation as described.

2-2. Configuration Example 2

A description is given next on a protection device 102 according to a configuration example 2.

The protection device 102 according to the configuration example 2 may include an airbag 151 that may be developed in the outside of the vehicle 101, e.g., ahead of the windshield 119, unlike the protection device 102 according to the configuration example 1. A configuration and operation of the protection device 102 according to the configuration example 2 may be similar to the configuration and the operation of the protection device 102 according to the configuration example 1, except for a configuration and operation described here.

The following description is given mainly on differences from the protection device 102 according to the configuration example 1. Components corresponding to those of the protection device 102 according to the configuration example 1 are denoted by same references, and description thereof is omitted.

Figure 15:
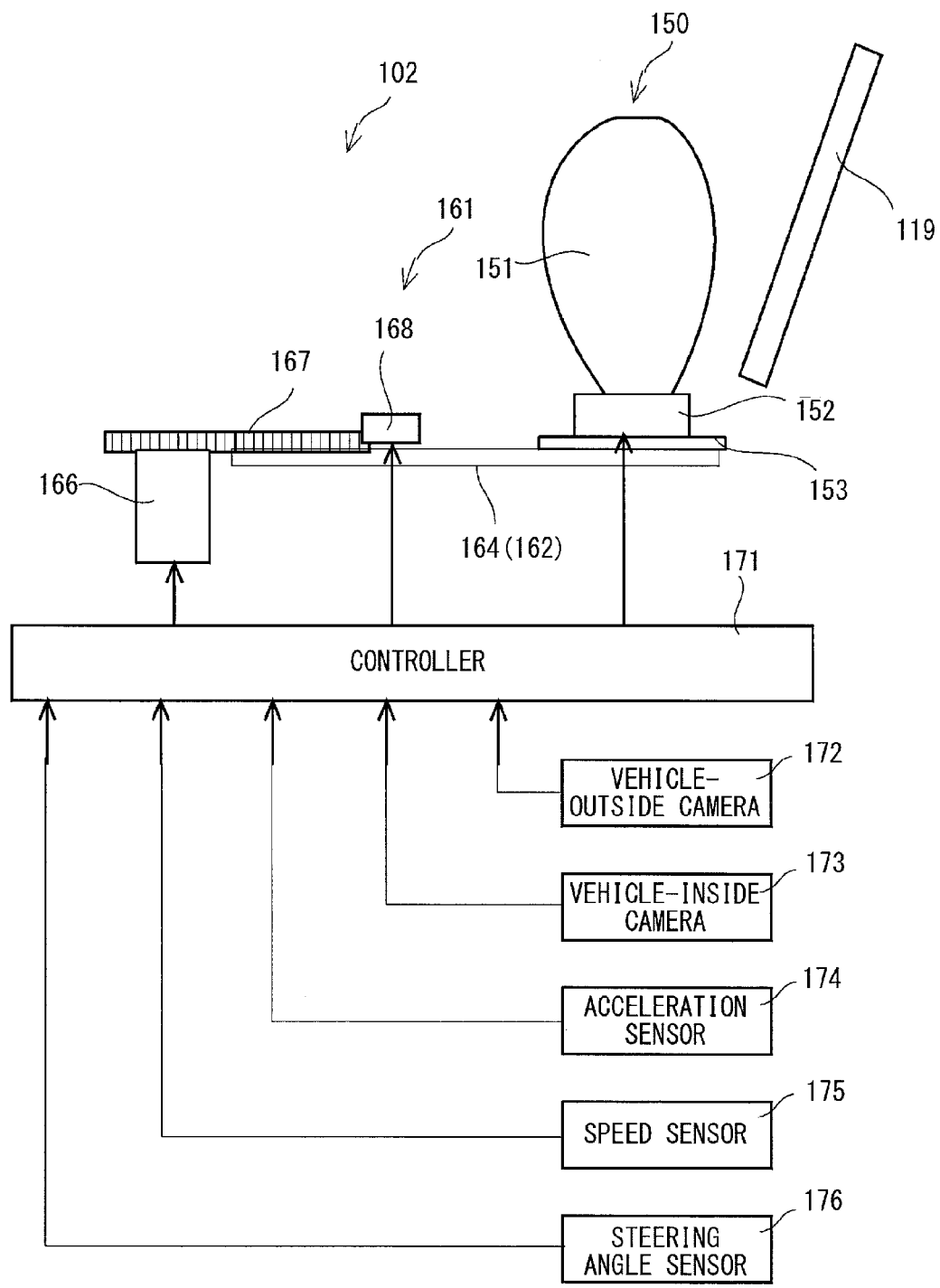
FIG. 15 illustrates arrangement of components of a vehicle occupant protection device according to a configuration example 2 of the second implementation of the technology.

FIG. 15 illustrates arrangement of components of the protection device 102 according to the configuration example 2.

The turning mechanism 162 of the actuator 161 may include a long arm 164. The long arm 164 may be attached to the vehicle 101, to allow one end, i.e., a first end, of the long arm 164 to be turned with respect to the vehicle 101. The module base 153 of the airbag module 150 may be fixed to the other end, i.e., a second end, of the long arm 164.

The first end of the long arm 164 may be fixed to the vehicle 101 below a hood. The long arm 164 may be extended rearward below the hood. The airbag module 150 may be attached to the second end of the long arm 164, below the hood, in a front-upward orientation with respect to the second end of the long arm 164. Thus, the actuator 161 attaches the airbag module 150 to the vehicle 101, to cause the turning of the airbag module 150 around the turning axis of the turning mechanism 162. The actuator 161 may cause the turning of the airbag module 150, to allow the airbag 151 to be developed toward a colliding object that is going to collide with the vehicle 101.

In the initial state, the long arm 164 may be extended in the front-rear direction. The long arm 164 may be turned leftward or rightward with utilization of the driving motor 166. The airbag module 150 may be turned along the circumferential direction around a front-end middle part of the vehicle 101.

The airbag 151 may have the vertically-elongated three-dimensional shape such as a substantially circular column. The airbag 151 may be developed ahead of the windshield 119.

In the following, the airbag 151 as described above is also referred to as a cyclist airbag 151.

The protection device 102 according to the configuration example 2 may operate, for example, as follows. The operation of the controller 171, i.e., the overall procedure of the turning operation of the airbag module 150, may be similar to the case as described with reference to FIG. 14.

Before the collision of the vehicle 101, the controller 171 may predict or determine the collision mode, on the basis of the input information that is supplied to the input output port (step ST1). The input information may indicate the internal and external situations of the vehicle 101.

In one specific but non-limiting implementation, the controller 171 may predict the collision of the vehicle 101 with a bicycle, on the basis of the information such as the captured image of the outside of the vehicle 1.

Thereafter, the controller 171 may determine, on the basis of the predicted collision mode, the presence or absence of the necessity of the turning of the airbag module 150, and the turning angle of the airbag module 150 (step ST2).

When the collision mode predicted by the controller 171 is the collision of the vehicle 101 with the automobile, the controller 171 may determine the absence of the necessity of the turning of the airbag module 150 that includes the cyclist airbag 151.

When the collision mode predicted by the controller 171 is the collision of the vehicle 101 with the bicycle, the controller 171 may determine the presence of the necessity of the turning of the airbag module 150 that includes the cyclist airbag 151.

Moreover, the controller 171 may determine the turning angle of the airbag module 150. In one specific but non-limiting implementation, the controller 171 may predict the collision-predicted part of the vehicle 101 and a direction of movement of the cyclist airbag 151 after the collision, on the basis of a direction of movement and a speed of the vehicle 101, and a direction of movement and a speed of the bicycle. Thus, the controller 171 may determine the turning angle that allows for the turning of the airbag module to a position on an extended line of the direction of movement of the cyclist airbag 151.

When the controller 171 determines the presence of the necessity of the turning of the airbag module 150, the controller 171 may unlock the lock mechanism 168 to allow the actuator 161 to drive the airbag module 150 (step ST3). In one specific but non-limiting implementation, the controller 171 may allow the actuator 61 to cause the turning of the airbag module 150, and allow the airbag 151 to be developed. This makes it possible to allow the airbag 151 to be developed toward a cyclist, in a direction in which the cyclist is moved after the collision. Thereafter, the controller 171 may allow the lock mechanism 168 to be on operation.

Thus, the airbag module 150 may be locked and kept from the turning, at the position to which the airbag module 150 is turned.

When the controller 171 determines the absence of the necessity of the turning of the airbag module 150, the controller 171 may end the operation without driving the actuator 161.

As described, in the protection device 102 according to the configuration example 2, the airbag module 150 may include the airbag 151 that may be developed to protect the cyclist ahead of the windshield 119. The controller 171 may allow the actuator 161 to cause the turning of the airbag module 150 toward the direction in which the cyclist is moved after the collision. This allows the airbag 151 to be developed from the direction in which the cyclist is moved, regardless of the collision mode with the cyclist, making it possible to support the cyclist with utilization of the developed airbag 151. Hence, it is possible to protect the cyclist in the increased variety of collision modes, without installing additional airbags, similarly to the protection device 102 according to the configuration example 1.

2-3. Configuration Example 3

A description is given next of a protection device 102 according to a configuration example 3.

The protection device 102 according to the configuration example 3 may include a front airbag 151 that may be developed above the navigator's seat 124, unlike the protection device 102 according to the configuration example 1 as described. A configuration and operation of the protection device 102 according to the configuration example 3 may be similar to the configuration and the operation of the protection device 102 according to the configuration example 1, except for a configuration and operation described here.

The following description is given mainly on differences from the protection device 102 according to the configuration example 1. Components corresponding to those of the protection device 102 according to the configuration example 1 are denoted by same references, and description thereof is omitted.

Figure 16:
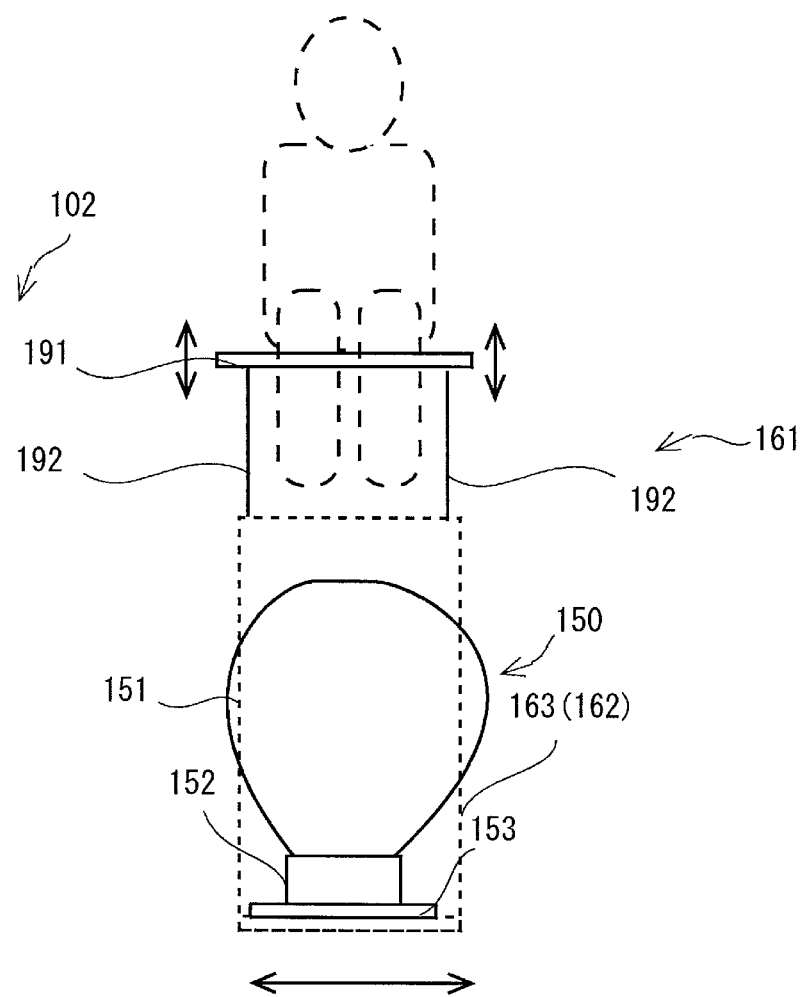
FIG. 16 is a front view of a configuration of a vehicle occupant protection device according to a configuration example 3 of the second implementation of the technology.

FIG. 16 illustrates a configuration of the protection device 102 according to the configuration example 3.

The actuator 161 may include the turning mechanism 162, a displacement member 191, and a wire 192.

The displacement member 191 may be disposed below the seating position of the navigator's seat 124. The displacement member 191 may be displaced in accordance with a load of the occupant who is seated on the seating position of the navigator's seat 124.

The wire 192 may couple the displacement member 191 directly to the L-shaped arm 163.

In the protection device 102 according to the configuration example 3, the displacement member 191 may not be displaced, when the occupant is seated on a substantially middle part of the seating position of the navigator's seat 124.

In contrast, the displacement member 191 may be displaced, when the occupant is seated on a substantially inner part or a substantially outer part of the seating position of the navigator's seat 124, and thus cause unevenness of the load applied to the navigator's seat 124. The wire 192 may pull the L-shaped arm 163 in the direction of the displacement of the displacement member 191 in accordance with the displacement of the displacement member 191, causing the turning of the L-shaped arm 163.

Hence, it is possible to protect the occupant in the increased variety of collision modes, without installing additional airbags, similarly to the protection device 102 according to the configuration example 1.

[3. Vehicle Occupant Protection Device According to Third Implementation]

A description is given next on a protection device according to a third implementation of the technology. The protection device may have any one of configurations as described in the following configuration examples 1 to 3.

3-1. Configuration Example 1

First, a description is given on a protection device 202 according to a first configuration example 1.

[Configuration of Vehicle to which Protection Device is Applied]

The protection device 202 according to the first configuration example 1 may be applied to a vehicle 201. The vehicle 201 may have a configuration, for example, as described below.

Figure 17A:
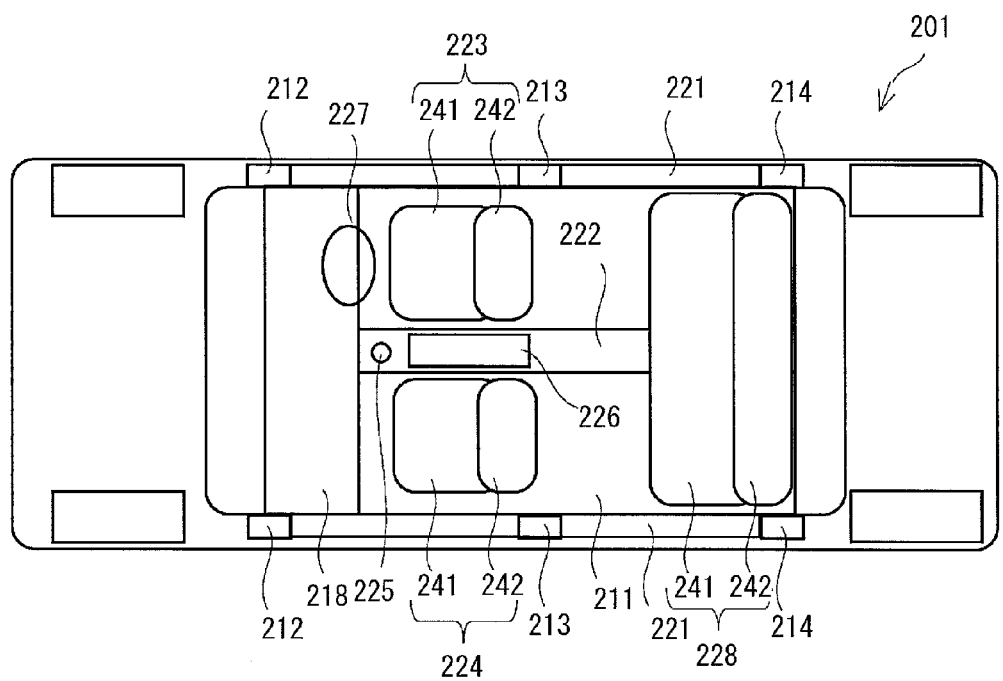
FIG. 17A is a schematic top view of a configuration of a vehicle to which a vehicle occupant protection device according to a configuration example 1 of a third implementation of the technology is applied.
Figure 17B:
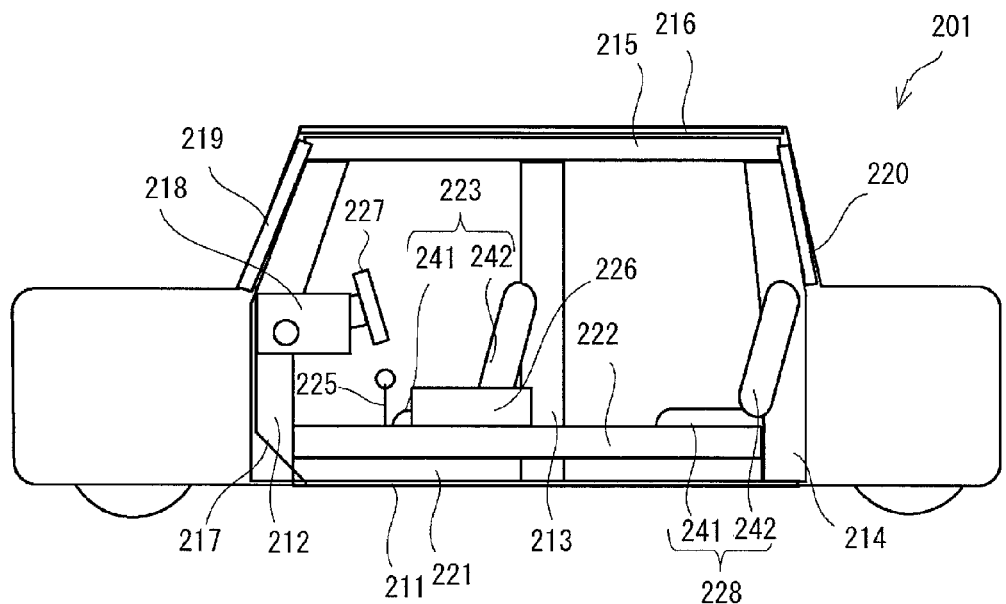
FIG. 17B is a schematic side view of the configuration of the vehicle to which the vehicle occupant protection device according to the configuration example 1 of the third implementation of the technology is applied.

FIGS. 17A and 17B schematically illustrate the configuration of the vehicle 201 to which the protection device 202 according to the configuration example 1 is applied. FIG. 17A is a top view, and FIG. 17B is a side view.

The configuration of the vehicle 201 may be, for example, substantially similar to the configuration of the vehicle 1 as described in the first implementation with reference to FIGS. 1A and 1B.

In one specific but non-limiting implementation, the vehicle 201 may be provided with the occupant compartment, the front chamber, and the rear chamber. The occupant compartment may include a floor panel 211, a pair of A pillars 212, a pair of B pillars 213, and a pair of C pillars 214. The pair of A pillars 212 and the pair of C pillars 214 may be coupled together by a pair of roof rails 215. A roof panel 216 may be joined to the pair of roof rails 215.

A toe board 217, for example, may be disposed between the floor panel 211 and the pair of A pillars 212. A dashboard 218, for example, may be disposed above the toe board 217. A windshield 219 may be fitted in space surrounded by the dashboard 218, the pair of A pillars 212, and the roof panel 216. A rear window 220 may be fitted in space between the pair of C pillars 214. A pair of side sills 221 may be joined to two sides of the floor panel 211 in the widthwise direction.

The floor panel 211 may be provided with, for example, a center tunnel 222. Components such as the drive shaft may be disposed below the center tunnel 222.

A front part of the floor panel 211 may be furnished with the front seats. The front seats may include, for example, the two seats, e.g., a driver's seat 223 and a navigator's seat 224. The driver's seat 223 may include, for example, a seating section 241, and a backrest section 242 attached to the seating section 241. The navigator's seat 224 may include, for example, the seating section 241 and the backrest section 242, similarly to the driver's seat 223 as mentioned above. The center tunnel 222 as mentioned above may be disposed between the driver's seat 223 and the navigator's seat 224. Components such as a shift lever 225, the undepicted parking brake lever, and a console box 226 may be disposed above the center tunnel 222. In one implementation, the console box 226 may serve as an "interior member".

The dashboard 218, for example, may be disposed in front of the driver's seat 223 and the navigator's seat 224. A steering wheel 227 may be disposed in front of the driver's seat 223.

A rear part of the floor panel 211 may be furnished with the rear seat. The rear seat may include, for example, the one seat, e.g., a bench seat 228. The bench seat 228 may include, for example, the seating section 241 and the backrest section 242, similarly to the driver's seat 223 as mentioned above. The bench seat 228 may have a width equivalent to, for example, a width of the floor panel 211.

[Configuration of Protection Device]

The protection device 202 may be mounted on the vehicle 201, and designed to protect the occupants or other conveyance objects if a collision should occur.

Figure 18:
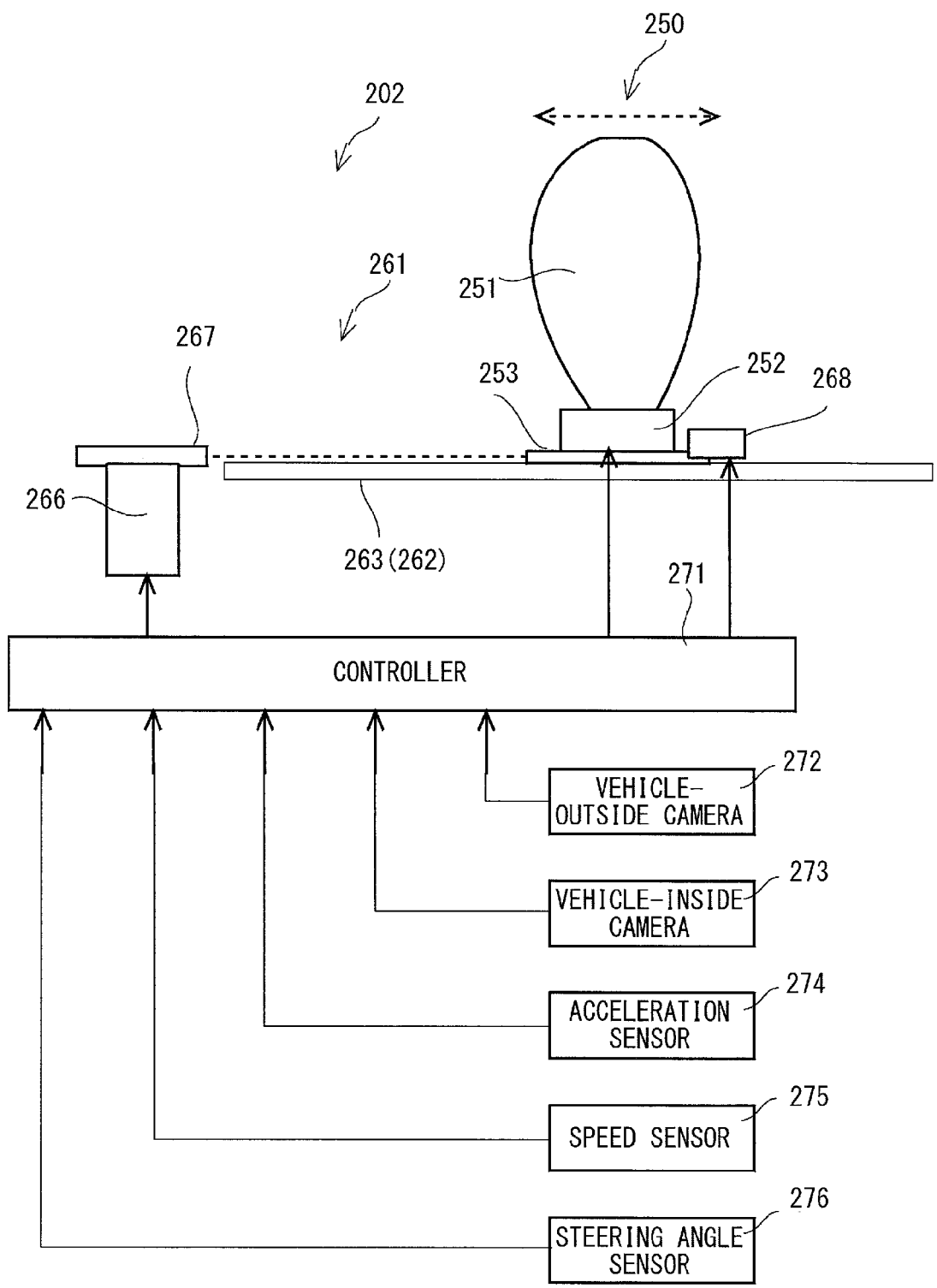
FIG. 18 illustrates a configuration of the vehicle occupant protection device according to the configuration example 1 of the third implementation of the technology.

FIG. 18 illustrates a configuration of the protection device 202 according to the configuration example 1.

The protection device 202 may include, an airbag module 250, an actuator 261, and a controller 271.

The airbag module 250 may include an airbag 251, an inflator 252, and a module base 253.

The airbag 251 may be made of, for example, cloth that is sewn in the bag shape.

The inflator 252 may include, for example, the small-sized tank that may store substances such as the explosive and the high-pressure gas. The inflator 252 allows the airbag 251 to develop. The inflator 252 may be coupled to the airbag 251.

The module base 253 may include, for example, the metal plate. The airbag 251 and the inflator 252 may be fixed to the module base 253.

The airbag 251 may be developed from the module base 253 toward the predetermined direction, i.e., the direction of the development.

The actuator 261 attaches the airbag module 250 to the vehicle 201, to cause a change in relative positional relation between the vehicle 201 and the airbag module 250. In one specific but non-limiting implementation, the actuator 261 may cause movement of the airbag module 250 along a predetermined locus. The actuator 261 may include a movement mechanism 262, a driving motor 266, a link mechanism 267, and a lock mechanism 268.

The movement mechanism 262 may attach the airbag module 250 to the vehicle 201, to cause the movement of the airbag module 250 relatively to the vehicle 201. The movement mechanism 262 may include a long rail 263. The long rail 263 may be fixed to the vehicle 201. The airbag module 250 may be attached to the long rail 263, to allow for the movement of the airbag module 250 in a lengthwise direction of the long rail 263.

The driving motor 266 may include, for example, a direct-current motor. The driving motor 266 may be attached to the vehicle 201.

The link mechanism 267 may include, for example, a wire and a bobbin. The bobbin may be attached to the driving motor 266. One end of the wire may be fixed to the module base 253 of the airbag module 250. The other end of the wire may be fixed to the bobbin. This allows the airbag module 250 to be moved along the long rail 263 with utilization of driving force of the driving motor 266. In one alternative, the link mechanism 267 may include, for example, a plurality of gears.

The lock mechanism 268 may lock the movement of the airbag module 250 when the airbag 251 is developed. The lock mechanism 268 may include a hook that is provided on the module base 253 of the airbag module 250. The lock mechanism 268 may allow the hook to be hooked on the long rail 263 before the airbag 251 is developed, to inhibit the movement of the airbag module 250. Thus, the airbag module 250 allows the airbag 251 to be developed in a state in which the change in the relative positional relation between the vehicle 201 and the airbag module 250 is caused by the actuator 261. In one specific but non-limiting implementation, the airbag module 250 may allow the airbag 251 to be developed at a position to which the airbag module 250 is moved with utilization of the driving motor 266.

Figure 19A:
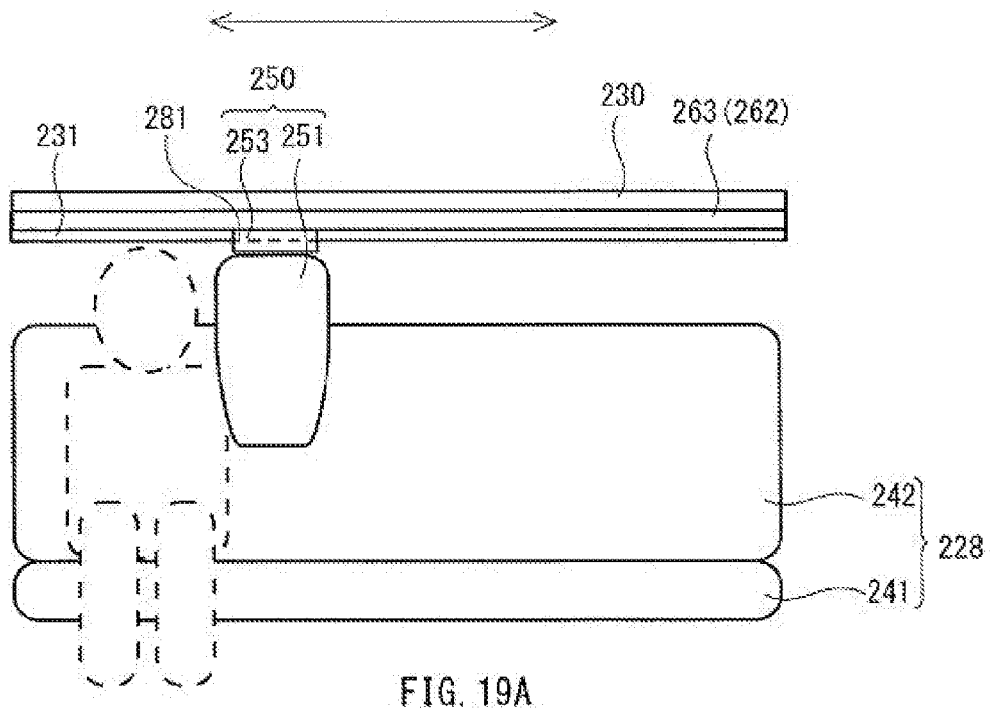
FIG. 19A is a front view of arrangement of components of the vehicle occupant protection device illustrated in FIG. 18.
Figure 19B:
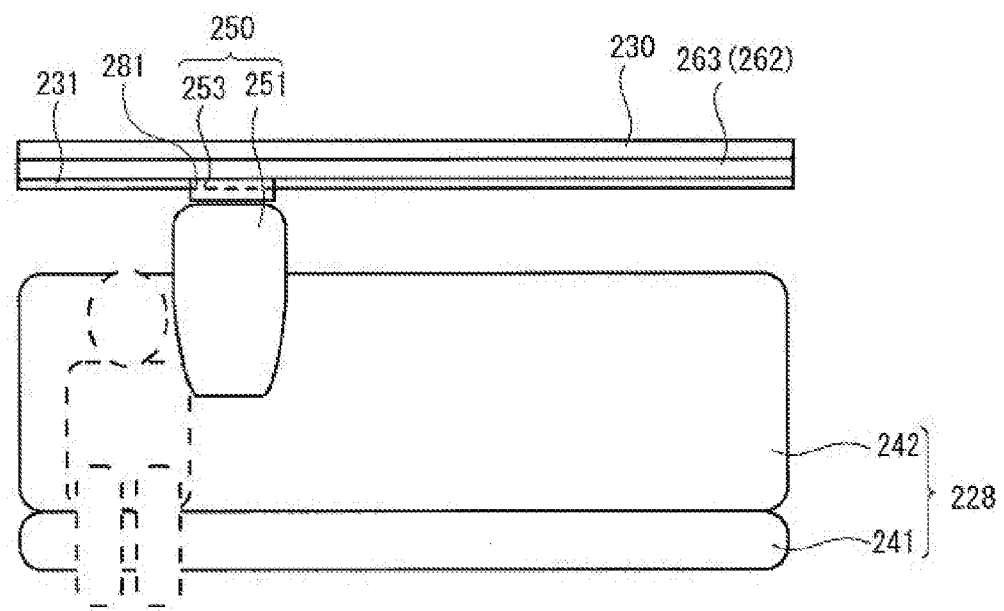
FIG. 19B is another front view of the arrangement of the components of the vehicle occupant protection device illustrated in FIG. 18.

FIGS. 19A and 19B are front views of arrangement of components of the protection device 202.

The airbag module 250 may be installed in, for example, an inside of a roof cover 231. In one implementation, the roof cover 231 may serve as an "interior member" of the vehicle 201.

The long rail 263 of the actuator 261 may be fixed to a roof cloth member 230. The roof cloth member 230 may be extended widthwise above the bench seat 228. One end and the other end of the roof cloth member 230 may be fixed to respective ones of the pair of roof rails 215. The airbag module 250 may be attached in a downward orientation. An initial position of the airbag module 250 may be a position at a distance equivalent to one third of a width of the roof cloth member 230 from an end of the roof cloth member 230 in the widthwise direction. At the initial position, the airbag module 250 may be located in a region between the middle seating position and the seating position on the outer side, out of the plurality of seating positions provided on the bench seat 228. At the initial position, the airbag module 250 may be located above the seating positions of the bench seat 228. Moreover, the airbag module 250 may be driven with utilization of the driving motor 266, and moved widthwise from the initial position.

The airbag 251 may have the vertically-elongated three-dimensional shape. The airbag 251 may be developed toward the bench seat 228, even when the airbag module 250 is moved leftward or rightward from the initial position.

A ceiling of the occupant compartment may be provided with a roof cover 231. In one implementation, the roof cover 231 may serve as an "interior member" of the vehicle 201. The roof cover 231 may have, for example, a plurality of breakers 281 that may selectively break in accordance with the position of movement of the airbag module 250. The plurality of breakers 281 may be extended widthwise along the direction of movement of the airbag module 250. Thus, the airbag 251 that has been developed inside the roof cover 231 may selectively break through the roof cover 231 with utilization of the breakers 281, and be developed downward from the roof cover 231.

In the following, the airbag 251 as described above is also referred to as a roof airbag 251. The roof airbag 251 may be developed toward a specific part of the occupant, e.g., a shoulder of the occupant.

The controller 271 determines a collision mode of the vehicle 201 as described later. The controller 271 also controls the relative positional relation between the vehicle 201 and the airbag module 250. The relative positional relation between the vehicle 201 and the airbag module 250 is changed by the actuator 261. The controller 271 may include, for example, the microcomputer. The microcomputer may include components such as the CPU, the ROM, the RAM, the input output port, and the system bus that couples the forgoing components. The ROM may store, for example, the program that may control operation of the protection device 202. The CPU may perform, as its main operation, the loading of the program stored in the ROM into the RAM, and the execution of the program. Thus, the microcomputer may serve as the controller 271 of the protection device 202.

The inflator 252, the driving motor 266, the lock mechanism 268, the various detectors, and other components may be coupled to the input output port. The various detectors may include, for example, a vehicle-outside camera 272, a vehicle-inside camera 273, an acceleration sensor 274, a speed sensor 275, and a steering angle sensor 276. The vehicle-outside camera 272 may capture, from inside the occupant compartment, an image of an outside of the vehicle 201, e.g., an image ahead of the vehicle 201. The vehicle-inside camera 273 may capture an image of an inside of the vehicle 201. The controller 271 may control operation of the protection device 202, on the basis of information inputted from the various detectors as exemplified above. The controller 271 may control the movement of the airbag module 250 caused by the actuator 261.

[Operation of Protection Device]

The protection device 202 according to the configuration example 1 may operate, for example, as follows.

Figure 20:
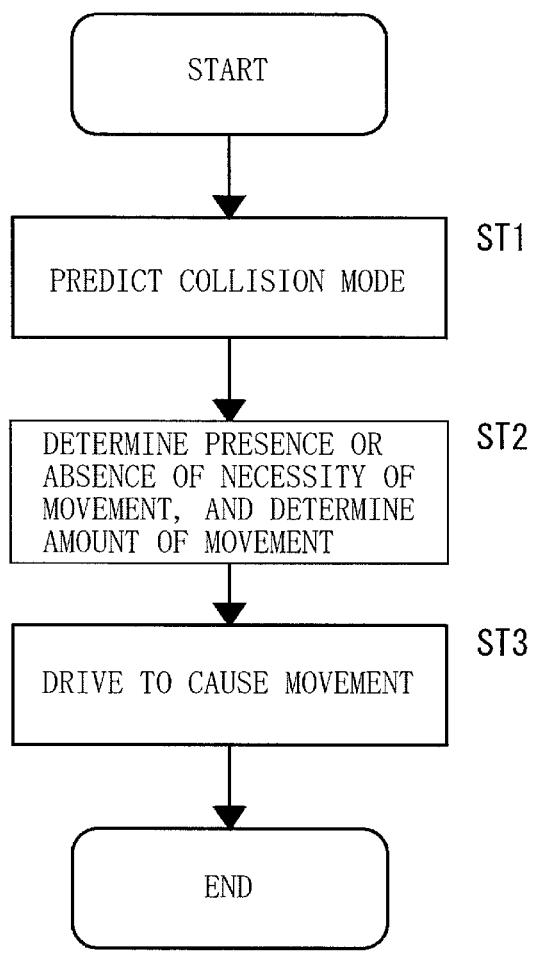
FIG. 20 is a flowchart that illustrates operation of a controller illustrated in FIG. 18, that is, a procedure of moving operation of an airbag module.

FIG. 20 is a flowchart that illustrates the operation of the controller 271 illustrated in FIG. 18, i.e., a procedure of moving operation of the airbag module 250. The controller 271 may periodically execute the operation illustrated in FIG. 20.

Before a collision of the vehicle 201, the controller 271 may predict or determine a collision mode, on the basis of input information that is inputted to the input output port (step ST1). The input information may indicate internal and external situations of the vehicle 201.

Here, the input information that may indicate the internal and external situations of the vehicle 201 may include, for example, one kind, or two or more kinds of the following: input information used in prediction of the collision mode of the vehicle 201; input information upon the collision of the vehicle 201; and input information that indicates the internal situation and the external situation of the vehicle 201. Non-limiting examples of the input information used in the prediction of the collision mode of the vehicle 201 may include the captured image of the outside of the vehicle 201. Non-limiting examples of the input information that indicates the internal situation and the external situation of the vehicle 201 may include the captured image of the inside of the vehicle 201.

Non-limiting examples of the collision mode may include the full-lap collision, the offset collision, the oblique collision, and the side collision, similarly to the first implementation as described. The differences among these collision modes may cause a change in behavior of the vehicle 201 and behavior of the occupants upon the collision.

The controller 271 may, therefore, firstly, predict or determine the collision mode, on the basis of the input information on the internal and external situations of the vehicle 201, in predicting or determining the collision mode before the collision of the vehicle 201.

In one specific but non-limiting implementation, the controller 271 may predict, on the basis of the information such as the captured image of the outside of the vehicle 201, relative positions of the vehicle 201 to the preceding vehicle, the opposite vehicle, and the structural object, and relative speeds of the vehicle 201 to respective ones of them. The controller 271 may further predict the degree of coincidence of the initial direction of the development of the airbag 251 and the direction of the input of the impact, and the magnitude of the impact.

The controller 271 may also predict, on the basis of the information such as the captured image of the inside of the vehicle 201, presence or absence of the occupant, the seating position of the occupant, the body build or the body shape of the occupant, and the body weight of the occupant. The controller 271 may further predict the degree of coincidence of the direction in which the occupant falls due to the impact and the initial direction of the development of the airbag 251, and the distance from the occupant to the interior member of the vehicle 201.

In this way, the controller 271 may predict or determine the collision mode.

The controller 271 may predict or determine the collision mode, not only in the ordinary state before the collision of the vehicle 201, but also upon the collision of the vehicle 201.

Thereafter, the controller 271 may determine, on the basis of the predicted collision mode, presence or absence of necessity of the movement of the airbag module 250, and an amount of movement of the airbag module 250 (step ST2). The amount of movement may take either discrete values or continuous values.

When the collision mode predicted by the controller 271 is the side collision, the controller 271 may determine the presence or absence of the necessity of the movement of the airbag module 250 that includes the roof airbag 251, and the amount of movement of the airbag module 250.

In this case, the controller 271 may determine, on the basis of the seating position of the occupant with respect to the bench seat 228, the presence or absence of the necessity of the movement of the airbag module 250, and the amount of movement of the airbag module 250.

In one specific but non-limiting implementation, the controller 271 may determine the absence of the necessity of the movement of the airbag module 250, when the three occupants are seated on the bench seat 228.

The controller 271 may determine the presence of the necessity of the movement of the airbag module 250, when the seating positions solely on the outer sides of the bench seat 228 are occupied by the occupants who have the small body builds. The controller 271 may determine the amount of movement, in accordance with the body build of the occupant, to allow the airbag 251 to be developed near the occupant.

When the controller 271 determines the presence of the necessity of the movement of the airbag module 250, the controller 271 may unlock the lock mechanism 268, to allow the actuator 261 to drive the airbag module 250 (step ST3). In one specific but non-limiting implementation, the controller 271 may allow the actuator 261 to cause the movement of the airbag module 250, and allow the airbag 251 to be developed. This allows the airbag 251 to be developed, not to generate gaps between the plurality of occupants who are seated on the bench seat 228. Thereafter, the controller 271 may allow the lock mechanism 268 to be on operation. Thus, the airbag module 250 may be locked and kept from the movement.

When the controller 271 determines the absence of the necessity of the movement of the airbag module 250, the controller 271 may end the operation without driving the actuator 261.

As described, the controller 271 may allow the actuator 261 to cause the movement of the airbag module 250 as appropriate before the collision of the vehicle 201. Meanwhile, the controller 271 may execute the operation of collision determination separately from the operation illustrated in FIG. 20, to determine the occurrence of the collision of the vehicle 201.

In the operation of the collision determination, the controller 271 may determine the occurrence of the collision, on the basis of the various kinds of detection information supplied to the input output port.

If the collision of the vehicle 201 should occur, the controller 271 may supply the inflator 252 with an ignition signal. The controller 271 may adjust the timing of output of the ignition signal to the inflator 252, to allow the occupant to jump in the airbag 251. The timing of the output of the ignition signal to the inflator 252 may be set to one of the following: timing of the development of the airbag 251 to its maximum size; timing immediately before the airbag 251 comes to its maximum size; and timing immediately after the airbag 251 comes to its maximum size.

In the airbag module 250, the inflator 252 may be supplied with the ignition signal, and ignite the explosive to blow the high-pressure gas into the airbag 251. This allows for the development of the airbag 251. The airbag 251 may begin to be developed in response to the high-pressure gas flowing into the airbag 251. Then, the airbag 251 may break through the roof cover 231 with utilization of the breakers 281, and be developed to its maximum size. Thereafter, when the inner pressure of the airbag 251 is further raised, the gas may begin to discharge from the airbag 251, causing the shrinkage of the airbag 251. The airbag 251 thus developed may come into contact with the occupant, which provides the better protection of the occupant, as compared to the case in which the occupant comes into contact with, for example, the interior member of the vehicle 201.

Moreover, the actuator 261 may cause the movement of the airbag module 250 as appropriate before the collision of the vehicle 201. This allows the airbag 251 to be developed near the occupant, in accordance with the body build of the occupant.

When the three occupants are seated on the bench seat 228, the airbag 251 may be developed in the initial state. This allows the airbag 251 to be developed in the region between adjacent two occupants. In other words, it is possible to allow the airbag 251 to be developed, to prevent the occupants from directly hitting one another.

When the seating positions solely on the outer sides of the bench seat 228 are occupied by the occupants who have the small body builds, the airbag 251 may be developed in a state in which the movement of the airbag module 250 is caused by the actuator 261. This makes it possible to allow the airbag 251 to be developed, while decreasing a gap generated between the developed airbag 251 and the occupants who are seated on the seating positions on the outer sides of the bench seat 228 and have the small body builds.

As described, the protection device 202 according to the configuration example 1 may include the airbag 251 that may be developed from above the bench seat 228. The controller 271 may allow the actuator 261 to cause the movement of the airbag module 250 in accordance with the factors such as the body build of the occupant. This makes it possible to support the occupant with utilization of the airbag 251, regardless of the factors such as the body build of the occupant, the number of the occupants, the seating position of the occupant seated on the bench seat 228. Hence, it is possible to protect the occupant in the increased variety of collision modes, without installing additional airbags, similarly to the first implementation as described.

3-2. Configuration Example 2

A description is given next on a protection device 202 according to a configuration example 2.

The protection device 202 according to the configuration example 2 may include an airbag 251 that may be developed in front of the navigator's seat 224, unlike the protection device 202 according to the configuration example 1. A configuration and operation of the protection device 202 according to the configuration example 2 may be similar to the configuration and the operation of the protection device 202 according to the configuration example 1, except for a configuration and operation described here.

The following description is given mainly on differences from the protection device 202 according to the configuration example 1. Components corresponding to those of the protection device 202 according to the configuration example 1 are denoted by same references, and description thereof is omitted.

Figure 21:
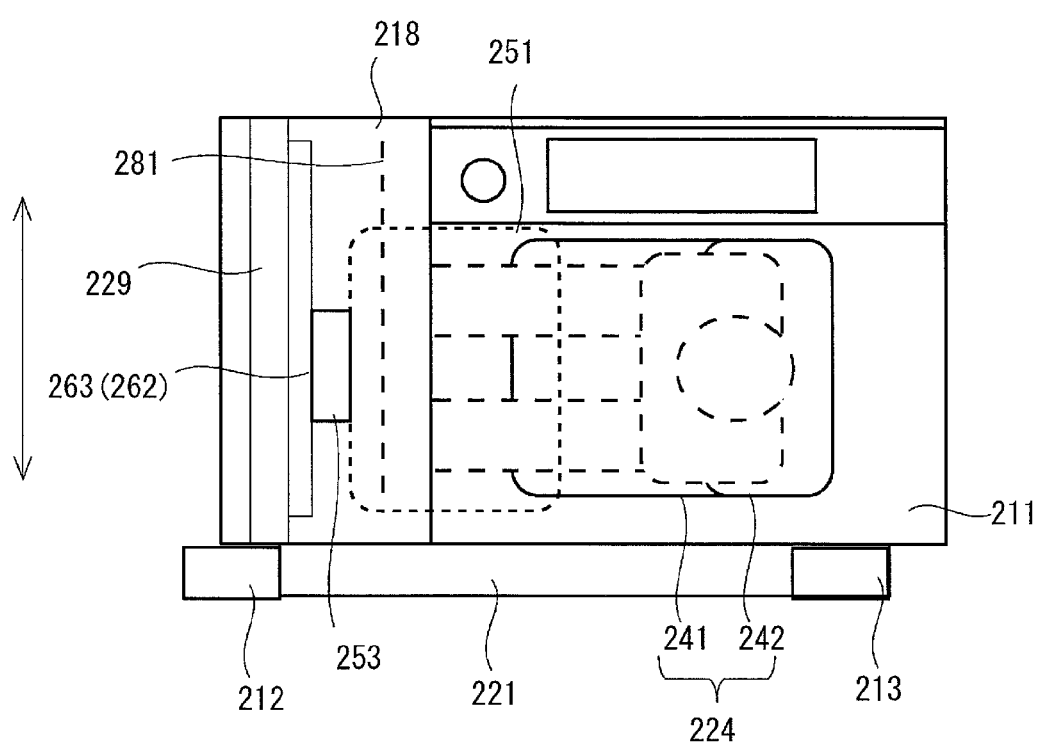
FIG. 21 is a top view of arrangement of components of a vehicle occupant protection device according to a configuration example 2 of the third implementation of the technology.

FIG. 21 illustrates arrangement of components of the protection device 202 according to the configuration example 2.

The long rail 263 of the movement mechanism 262 may be attached to a steering support beam 229, and extended widthwise. The steering support beam 229 may be disposed in the inside of the dashboard 218. The steering support beam 229 may be extended from one of the pair of A pillars 212 to another of the pair of A pillars 212. The steering support beam 229 may be fixed to the pair of A pillars 212.

The airbag 251 may have the three-dimensional shape elongated in the front-rear direction. The module base 253 may be attached to the movement mechanism 262, to allow the airbag 251 to be developed in a rearward orientation. The airbag 251 may be developed rearward from the module base 253. In the initial state, the airbag 251 may be developed toward the navigator's seat 224 from a position in front of the navigator's seat 224. In a state in which the airbag module 250 is moved widthwise from an initial position, the airbag 251 may be developed in a slightly deviated state leftward or rightward from the navigator's seat 224.

The dashboard 218 may have, for example, a plurality of breakers 281. The plurality of breakers 281 may be extended widthwise within a range of movement of the airbag module 250. Thus, the airbag 251 that has been developed inside the dashboard 218 may break through the dashboard 218 with utilization of the breakers 281, and be developed rearward from the dashboard 218.

In the following, the airbag 251 as described above is also referred to as a front airbag 251.

The protection device 202 according to the configuration example 2 may operate, for example, as follows. The operation of the controller 271, i.e., the overall procedure of the moving operation of the airbag module 250, may be similar to the case as described with reference to FIG. 20.

Before the collision of the vehicle 201, the controller 271 may predict or determine the collision mode, on the basis of the input information that is supplied to the input output port (step ST1). The input information may indicate the internal and external situations of the vehicle 201.

Thereafter, the controller 271 may determine, on the basis of the predicted collision mode, the presence or absence of the necessity of the movement of the airbag module 250, and the amount of movement of the airbag module 250 (step ST2). The amount of movement may take either discrete values or continuous values.

When the collision mode predicted by the controller 271 is, for example, the full-lap collision, the controller 271 may determine the presence or absence of the necessity of the movement of the airbag module 250 that includes the front airbag 251, and the amount of movement of the airbag module 250. Thus, the controller 271 may determine the absence of the necessity of the movement of the airbag module 250.

When the collision mode predicted by the controller 271 is, for example, the oblique collision, the controller 271 may determine the presence or absence of the necessity of the movement of the airbag module 250 that includes the front airbag 251, and the amount of movement of the airbag module 250. Thus, the controller 271 may determine the presence of the necessity of the movement of the airbag module 250. The controller 271 may determine the amount of movement of the airbag module 250, to allow the airbag 251 to be developed toward the direction of the input of the impact or the direction in which the occupant falls. The direction of the input of the impact may correspond to the predicted angle of the collision. Moreover, the controller 271 may make fine adjustment of the amount of movement of the airbag module 250, on the basis of the body build of the occupant or the body weight of the occupant, and the predicted angle of the collision, in order to support the occupant with utilization of the airbag 251.

When the controller 271 determines the presence of the necessity of the movement of the airbag module 250, the controller 271 may unlock the lock mechanism 268, to allow the actuator 261 to drive the airbag module 250 (step ST3). In one specific but non-limiting implementation, the controller 271 may allow the actuator 261 to cause the movement of the airbag module 250, and allow the airbag 251 to be developed. This makes it possible to allow the airbag 251 to be developed toward the direction in which the occupant falls who is seated on the navigator's seat 224. Thereafter, the controller 271 may allow the lock mechanism 268 to be on operation. Thus, the airbag module 250 may be locked, and kept from the movement.

When the controller 271 determines the absence of the necessity of the movement of the airbag module 250, the controller 271 may end the operation without driving the actuator 261.

As described, in the protection device 202 according to the configuration example 2, the controller 271 may allow the actuator 261 to cause the movement of the airbag module 250 in the direction in which the occupant falls who is seated on the navigator's seat 224. The airbag 251 may be developed toward the direction in which the occupant falls. The occupant may fall, and come into contact with the developed airbag 251. It is therefore possible for the airbag 251 to come into contact with the occupant, regardless of the collision modes. Moreover, the airbag module 250 may be moved in advance, making it possible to prevent the airbag 251 from falling even when the airbag 251 receives a load attributed to the occupant who falls obliquely. This makes it possible to support the occupant with utilization of the airbag 251, not only during the full-lap collision, but also during the offset collision or the oblique collision. Hence, it is possible to protect the occupant in the increased variety of collision modes, without installing additional airbags, similarly to the protection device 202 according to the configuration example 1.

3-3. Configuration Example 3

A description is given next of a protection device 202 according to a configuration example 3.

The protection device 202 according to the configuration example 3 may include an airbag 251 that may be developed above the bench seat 228, unlike the protection device 202 according to the configuration example 1 as described. A configuration and operation of the protection device 202 according to the configuration example 3 may be similar to the configuration and the operation of the protection device 202 according to the configuration example 1, except for the a configuration and operation described here.

The following description is given mainly on differences from the protection device 202 according to the configuration example 1. Components corresponding to those of the protection device 202 according to the configuration example 1 are denoted by same references, and description thereof is omitted.

Figure 22:
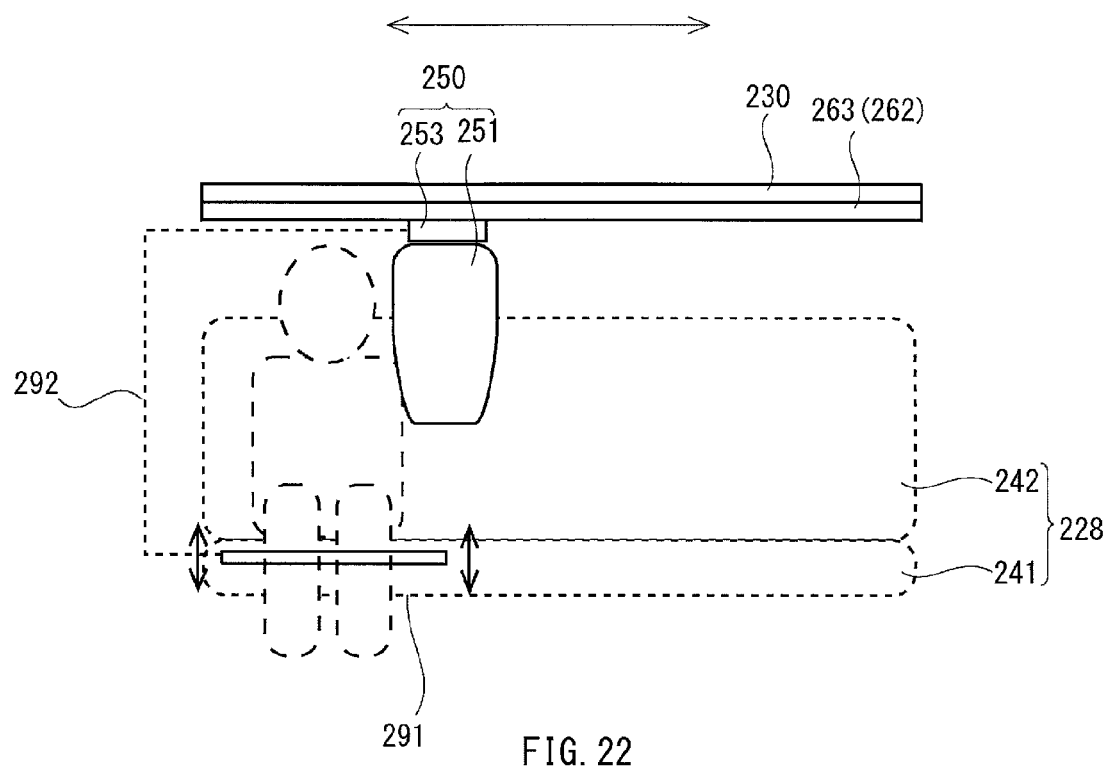
FIG. 22 is a front view of arrangement of components of a vehicle occupant protection device according to a configuration example 3 of the third implementation of the technology.

FIG. 22 is a front view of a configuration of the protection device 202 according to the configuration example 3.

In the protection device 202 according to the configuration example 3, the actuator 261 may include the movement mechanism 262, a displacement member 291, and a wire 292.

The displacement member 291 may be disposed below the seating position on the outer side of the bench seat 228. The displacement member 291 may be displaced in accordance with the load of the occupant who is seated on the above-mentioned seating position of the bench seat 228.

The wire 292 may couple the displacement member 291 directly to the module base 253.

In the protection device 202 according to the configuration example 3, the displacement member 291 may not be displaced, when the occupant is seated on the middle seating position of the bench seat 228.

In contrast, the displacement member 191 may be displaced, when the occupant is seated on the seating position on the outer side of the bench seat 228, and thus cause the unevenness of the load applied to the bench seat 228. The wire 292 may allow the module base 253 to be moved outwardly in accordance with the displacement of the displacement member 291.

Hence, it is possible to protect the occupant in the increased variety of collision modes, without installing additional airbags, similarly to the protection device 202 according to the configuration example 1.

Implementations as described above are merely exemplifications of preferred implementations of the technology. Details of the implementations of the technology are not limited to those described in the forgoing implementations, accordingly. It should be appreciated that modifications and alterations may be made without departing from the scope of the technology.

The invention claimed is:

1. A vehicle occupant protection device, comprising:
an airbag module including an airbag and an inflator that allows the airbag to develop;
an actuator that attaches the airbag module to a vehicle, to cause a change in a relative positional relation between the vehicle and the airbag module; and
a controller that determines a collision mode of the vehicle, on a basis of one or more of input information used in prediction of the collision mode, input information upon a collision of the vehicle, and input information on an occupant in the vehicle including predictions of occupant's situation, and controls the relative positional relation between the vehicle and the airbag module,
the airbag module allowing the airbag to be developed in a state in which the change in the relative positional relation between the vehicle and the airbag module is caused by the actuator.

2. The vehicle occupant protection device according to claim 1, wherein the actuator attaches the airbag module to the vehicle, to cause a rotation of the airbag module around a predetermined rotation axis, and
wherein the airbag module allows the airbag to be developed in a state in which the rotation of the airbag module is caused by the actuator.

3. The vehicle occupant protection device according to claim 2, wherein the controller controls the rotation of the airbag module caused by the actuator,
wherein the controller determines, on a basis of on a determination result of the collision mode, one or both of a rotation angle of the airbag module and a presence or an absence of necessity of the rotation of the airbag module, and
wherein the controller allows the actuator to cause the rotation of the airbag module, when the controller determines the presence of the necessity of the rotation of the airbag module.

4. The vehicle occupant protection device according to claim 3, wherein the controller determines, in determining the collision mode, at least one of:
(1) a degree of coincidence of a direction of a development of the airbag and a direction of input of an impact;
(2) a degree of coincidence of a direction in which an occupant falls due to the impact and the direction of the development of the airbag;
(3) a magnitude of the impact;
(4) g presence or an absence of the occupant;
(5) a body shape of the occupant;
(6) a body weight of the occupant; or
(7) a distance from the occupant to an interior member of the vehicle.

5. The vehicle occupant protection device according to claim 3, wherein the controller allows the actuator to cause the rotation of the airbag module, when the controller predicts the collision of the vehicle.

6. The vehicle occupant protection device according to claim 2, wherein the airbag has an anisotropic shape, and
wherein the rotation of the airbag module causes a change in one or both of a thickness and a shape of the airbag in a direction of input of an impact.

7. The vehicle occupant protection device according to claim 2, wherein the vehicle includes one or more seats, each of the one or more seats including a plurality of seating positions that are arranged in a widthwise direction, and
wherein the airbag is allowed to be developed in a region between the plurality of seating positions.

8. The vehicle occupant protection device according to claim 2, wherein the rotation of the airbag module causes a direction of the development of the airbag to be changed around the rotation axis.

9. The vehicle occupant protection device according to claim 8, wherein the vehicle includes a seat,
wherein the airbag module is attached to the seat, and
wherein the seat includes a plurality of breakers that selectively break in accordance with a rotation angle of the airbag module.

10. The vehicle occupant protection device according to claim 3, wherein the controller determines the rotation angle of the airbag module, to allow a predetermined position of the developed airbag to come into contact with an occupant.

11. The vehicle occupant protection device according to claim 10, wherein the airbag includes one or both of a recess and a projection that come into contact with the occupant when the airbag is developed, and
wherein the controller determines the rotation angle of the airbag module, to allow a predetermined impact-absorbing surface of the airbag to come into contact with the occupant, the predetermined impact-absorbing surface being defined as part or all of a surface of the one or both of the recess and the projection.

12. The vehicle occupant protection device according to claim 11, wherein the controller determines the rotation angle of the airbag module, on a basis of a predicted speed of the collision of the vehicle and a predicted angle of the collision of the vehicle, to allow the impact-absorbing surface to come into contact with the occupant.

13. The vehicle occupant protection device according to claim 10, wherein the controller determines the rotation angle of the airbag module, to allow a different position from the predetermined position of the developed airbag to come into contact with the occupant.

14. The vehicle occupant protection device according to claim 13, wherein the controller determines the rotation angle of the airbag module, on a basis of a predicted speed of the collision of the vehicle and a predicted angle of the collision of the vehicle, to allow the different position from the predetermined position of the airbag to come into contact with the occupant.

15. The vehicle occupant protection device according to claim 3, wherein the actuator includes a link mechanism that is driven by the controller and causes the rotation of the airbag module.

16. The vehicle occupant protection device according to claim 2, wherein the vehicle includes a seat, and
wherein the actuator includes:
a displacement member that is displaced in a response to a seating of an occupant on the seat; and
a link mechanism that causes the rotation of the airbag module, in response to a displacement of the displacement member.

17. The vehicle occupant protection device according to claim 1, wherein the actuator attaches the airbag module to the vehicle, to cause a turning of the airbag module, the turning of the airbag module involving a movement of the airbag module with a change in orientation, and
wherein the airbag module allows the airbag to be developed in a state in which the turning of the airbag module is caused by the actuator.

18. The vehicle occupant protection device according to claim 17, wherein the controller controls the turning of the airbag module caused by the actuator,
wherein the controller determines, on a basis of a determination result of the collision mode, one or both of an amount of turning of the airbag module and a presence or an absence of necessity of the turning of the airbag module, and
wherein the controller allows the actuator to cause the turning of the airbag module, when the controller determines the presence of the necessity of the turning of the airbag module.

19. The vehicle occupant protection device according to claim 18, wherein the controller determines, in determining the collision mode, at least one of:
(1) a degree of coincidence of a direction of a development of the airbag and a direction of input of an impact;
(2) a degree of coincidence of a direction in which an occupant falls due to the impact and the direction of the development of the airbag;
(3) a magnitude of the impact;
(4) a presence or an absence of the occupant;
(5) a body shape of the occupant;
(6) a body weight of the occupant; or
(7) a distance from the occupant to an interior member of the vehicle.

20. The vehicle occupant protection device according to claim 18, wherein the controller allows the actuator to cause the turning of the airbag module, when the controller predicts the collision of the vehicle.

21. The vehicle occupant protection device according to claim 17, wherein the vehicle includes a seat, and
wherein the airbag module is turned along a circumferential direction around a seating position of the seat on which an occupant is seated.

22. The vehicle occupant protection device according to claim 21, wherein the airbag is oriented toward the occupant, during the turning of the airbag module outwardly of the vehicle.

23. The vehicle occupant protection device according to claim 22, wherein the actuator causes the turning of the airbag module to a position on a line that connects a collision-predicted part of the vehicle and a head of the occupant.

24. The vehicle occupant protection device according to claim 17, wherein the vehicle includes an interior member,
wherein the airbag module is disposed in an inside of the interior member, and
wherein the interior member includes a plurality of breakers that selectively break in a response to the turning of the airbag module.

25. The vehicle occupant protection device according to claim 17, wherein the actuator causes the turning of the airbag module, to allow the airbag to be developed toward a colliding object that is going to collide with the vehicle.

26. The vehicle occupant protection device according to claim 18, wherein the actuator includes a link mechanism that is driven by the controller and causes the turning of the airbag module.

27. The vehicle occupant protection device according to claim 17, wherein the vehicle includes a seat, and
wherein the actuator includes:
a displacement member that is displaced in a response to a seating of an occupant on the seat, and
a link mechanism that causes the turning of the airbag module, in a response to a displacement of the displacement member.

28. The vehicle occupant protection device according to claim 1, wherein the actuator attaches the airbag module to the vehicle, to cause a movement of the airbag module along a predetermined locus, and
wherein the airbag module allows the airbag to be developed in a state in which the movement of the airbag module is caused by the actuator.

29. The vehicle occupant protection device according to claim 28, wherein the controller controls the movement of the airbag module caused by the actuator,
wherein the controller determines the collision mode, on a basis of input information that indicates one or both of an internal situation and an external situation of the vehicle, the collision mode including at least one of:
(1) prediction of the collision of the vehicle;
(2) the internal situation of the vehicle before the collision;
(3) a collision state of the vehicle upon the collision; or
(4) the internal situation of the vehicle upon the collision,
wherein the controller determines, on a basis of a determination result of the collision mode, one or both of an amount of the movement of the airbag module and a presence or an absence of necessity of the movement of the airbag module, and
wherein the controller allows the actuator to cause the movement of the airbag module, when the controller determines the presence of the necessity of the movement of the airbag module.

30. The vehicle occupant protection device according to claim 29, wherein the controller determines, in determining the collision mode, at least one of:
(1) a degree of coincidence of a direction of a development of the airbag and a direction of input of an impact;
(2) a degree of coincidence of a direction in which an occupant falls due to the impact and the direction of the development of the airbag;
(3) a magnitude of the impact;
(4) a presence or an absence of the occupant;
(5) a body shape of the occupant;
(6) a body weight of the occupant; or
(7) a distance from the occupant to an interior member of the vehicle.

31. The vehicle occupant protection device according to claim 29, wherein the controller allows the actuator to cause the movement of the airbag module, when the controller predicts the collision of the vehicle.

32. The vehicle occupant protection device according to claim 29, wherein the controller allows the actuator to cause the movement of the airbag module, when the controller determines a seating position of an occupant.

33. The vehicle occupant protection device according to claim 29, wherein the controller allows the actuator to cause the movement of the airbag module, to allow the airbag to be developed toward a specific part of an occupant.

34. The vehicle occupant protection device according to claim 28, wherein the vehicle includes a seat, and wherein the airbag module is disposed in a front of the seat, and the actuator causes the movement of the airbag module in a widthwise direction of the vehicle.

35. The vehicle occupant protection device according to claim 28, wherein the vehicle includes a seat, and wherein the airbag module is disposed above the seat, and the actuator causes the movement of the airbag module in a widthwise direction of the vehicle.

36. The vehicle occupant protection device according to claim 28, wherein the vehicle includes an interior member, wherein the airbag module is disposed in an inside of the interior member, and wherein the interior member includes a plurality of breakers that selectively break in accordance with a position to which the airbag module is moved.

37. The vehicle occupant protection device according to claim 29, wherein the actuator includes one or both of a wire and a link mechanism that are driven by the controller and cause the movement of the airbag module.

38. The vehicle occupant protection device according to claim 28, wherein the vehicle includes a seat, and wherein the actuator includes:
a displacement member that is displaced in a response to a seating of an occupant on the seat; and
one or both of a wire and a link mechanism that cause the movement of the airbag module, in response to a displacement of the displacement member.

* * * * *